United States Patent
Onishi et al.

(10) Patent No.: US 8,134,256 B2
(45) Date of Patent: Mar. 13, 2012

(54) POWER RECEIVING CONTROL DEVICE, POWER RECEIVING DEVICE, AND ELECTRONIC APPARATUS

(75) Inventors: Kota Onishi, Nagoya (JP); Masayuki Kamiyama, Nagoya (JP); Nobutaka Shiozaki, Nagoya (JP); Kentaro Yoda, Chino (JP); Takahiro Kamijo, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

(21) Appl. No.: 12/503,366

(22) Filed: Jul. 15, 2009

(65) Prior Publication Data
US 2010/0013321 A1 Jan. 21, 2010

(30) Foreign Application Priority Data
Jul. 15, 2008 (JP) .................................. 2008-183853

(51) Int. Cl.
H01F 38/00 (2006.01)
(52) U.S. Cl. ....................................................... 307/104
(58) Field of Classification Search .................. 307/104
See application file for complete search history.

(56) References Cited

U.S. PATENT DOCUMENTS
2008/0169706 A1* 7/2008 Onishi et al. .................. 307/104
2008/0200119 A1* 8/2008 Onishi et al. ................. 455/41.1
2009/0001932 A1* 1/2009 Kamijo et al. ................ 320/108

FOREIGN PATENT DOCUMENTS
JP A 2006-60909 3/2006
* cited by examiner

*Primary Examiner* — Jared Fureman
*Assistant Examiner* — Hal Kaplan
(74) *Attorney, Agent, or Firm* — Oliff & Berridge, PLC

(57) ABSTRACT

A power receiving control device provided to a power receiving device in a contactless power transmission system that transmits power from a power transmission device by electromagnetically coupling primary and secondary coils to feed electric power to a load. The power receiving control device includes a power receiving side control circuit. The power receiving side control circuit turns on a switch circuit provided between input and output nodes of a regulator in the power receiving device based on detecting lowering power feeding capability. The power receiving side control circuit turns off the switch circuit when power feeding is temporarily stopped in a period when the regulator is bypassed when voltage of a power supply control signal output terminal switches levels or before the power feeding is temporarily stopped. The power receiving side control circuit turns on the switch circuit after releasing the temporary stop of power feeding.

7 Claims, 13 Drawing Sheets

(RESTART OF POWER FEEDING AND RESET OF COMPARATOR)

(RETURN TO BYPASS ON STATE)

US 8,134,256 B2

POWER RECEIVING CONTROL DEVICE, POWER RECEIVING DEVICE, AND ELECTRONIC APPARATUS

The present application claims a priority based on Japanese Patent Application No. 2008-183853 filed on Jul. 15, 2008, the contents of which are incorporated herein by reference.

BACKGROUND

1. Technical Field

The present invention relates to a power receiving control device, a power receiving device, and an electronic apparatus.

2. Related Art

In resent years, a contactless power transmission technique, which utilizes electromagnetic induction so as to enable power transmission even without a metallic contact point, has attracted lots of attention. As an application of the contactless power transmission technique, charging of a cellphone or a household appliance (for example, a cordless handset for a telephone) is proposed.

JP-A-2006-60909, for example, discloses a contactless power transmission device using a primary coil and a secondary coil.

Recently, secondary batteries such as a lithium-ion battery and a lithium polymer battery have been widely used as a battery of a cell-phone or a mobile terminal of a notebook-sized personal computer and the like. The secondary batteries such as the lithium-ion battery and the lithium polymer battery have such an advantage that their energy concentration is substantially high compared to other kinds of batteries. However, they require rigorous charging control with a consideration to deterioration or safety thereof, thus requiring highly-accurate charging control technique.

Therefore, it is preferable to use a charging circuit utilizing a regulator (series regulators, for example) which can highly accurately perform output control for charging a secondary battery.

Considering usability of users, shorter charging time of the secondary battery is favorable. However, charging efficiency of the secondary battery utilizing the contactless power transmission is lower than that of a normal charger (a charger using an AC adaptor) and therefore the secondary battery utilizing the contactless power transmission tends to require longer charging time. Therefore, it is important that power loss in the charging is reduced as much as possible when a mobile terminal is charged by using the contactless power transmission.

According to an inspection of the inventor, it became apparent that power loss occurs in the regulator described above to hinder decrease of the charging time in a case requiring flow of a large amount of charging current such as a case of charging a secondary battery with high exhaustion. Considering the safety of the mobile terminal, it is preferable to minimize the heat generation of the regulator in charging.

Therefore, the inventor studied a technique for reducing power loss and heat generation of the regulator. In the technique, when power feeding capability for the secondary battery is decreased, a bypass path bypassing the regulator is formed and current is supplied to a load (the second battery, for example) which is an object of the power feeding through the bypass path.

As a result of the study, the following thing became apparent. It become apparent that, in power supply through the bypass path bypassing the regulator, overshoot and undershoot might occur in a case where power feeding to the load as the power feeding object is temporarily stopped or in a case where the power feeding under the temporal stop is restarted.

That is, in the case where the power feeding to the load as the power feeding object is temporarily stopped, the current is suddenly stopped. Therefore, a voltage at an output node of the regulator rises sharply, causing overshoot. When the power feeding, which has been temporarily stopped, is restarted, the load rapidly draws great current so as to cause a lack of power supply. Therefore, the voltage at the output node of the regulator is rapidly decreased, causing undershoot. Overshoot and undershoot may cause defects such as a damage of a circuit at the secondary side and require of reset of a control IC (for example, a charging device for controlling charge of the secondary battery) for controlling the power feeding to the load.

Here, in the power feeding to the load as the power feeding object, such controls as the temporary stop of the power feeding and the restart of the power feeding, which has been stopped, may be required when a signal is transmitted from the secondary side to the primary side, for example. That is, if a large amount of current is supplied to the load in the modulation of the load of the power receiving device, the primary side has a difficulty to detect change of a voltage, which occurs by the load modulation, at a coil end of the primary coil. Thus, the primary side has a difficulty to recognize a communication signal produced by the load modulation. Therefore, in a period of the load modulation, the power feeding to the load is temporarily stopped. Accordingly, the primary side can securely detect the communication signal produced by the load modulation. After the completion of the load modulation, the power feeding to the load needs to be restarted.

The communication by the load modulation from the secondary side to the primary side in the power feeding to the load (in a period of a normal power transmission) is required for periodic authentication for foreign object detection (takeover detection), for example. If a foreign object (a thin metal plate, for example) having a large area is inserted between the primary coil and the secondary coil in the normal power transmission from the primary side to the secondary side, the foreign object consumes whole of the power supplied from the primary side. Then the primary side determines that the secondary side device exists, and therefore the normal power transmission is continued. This state is called a "takeover state". If the takeover state arises, the foreign object generates heat so as to cause accidents such as device damage and burn injury. Therefore, the secondary side device periodically (every second, for example) transmits a signal having a predetermined pattern ("0", "1", "0", for example) by load modulation. When the takeover state does not arise, the primary side can periodically detect a signal having a predetermined pattern and transmitted from the secondary side. On the other hand, when the takeover state arises, the primary side can not detect the signal having the predetermined pattern and transmitted from the secondary side, thereby being able to detect an occurrence of the takeover state. The detection of the takeover state depending on whether the signal periodically transmitted from the secondary side can be received or not is referred to as periodic authentication.

Therefore, in a case where the period during which the bypass path bypassing the regulator for supplying great current to the load is in an ON state overlaps with a period of the periodic authentication, for example, overshoot or undershoot described above may disadvantageously occur.

That is, communication by the load modulation from the secondary side to the primary side is required at the timing of the periodic authentication. At this time, the power feeding to the load is temporarily stopped, so that the current is stopped to increase the voltage at the output node of the regulator, causing overshoot. On the other hand, when the power feeding, which has been temporarily stopped, to the load is restarted after the completion of the load modulation (periodic authentication, the power feeding current can not follow, causing undershoot. Such problems were exposed by the study of the inventor.

SUMMARY

The present invention is based on such observation. According to the following aspects, the bypassing technique of the regulator can decrease, for example power loss and heat generation of the power receiving device. Further, even when power feeding to the load is temporarily stopped or when the power feeding, which has been stopped, is restarted in the bypassing state, occurrence of large overshoot and large undershoot can be prevented.

A power receiving control device, according to a first aspect of the invention, provided to a power receiving device included in a contactless power transmission system transmitting electric power from a power transmission device to the power receiving device by electromagnetically coupling a primary coil and a secondary coil so as to feed the electric power to a load serving as a power feeding object from a voltage output node of the power receiving device, which includes a rectifying circuit and a regulator; and transmitting a load modulation signal to the power transmission device by load modulation performed by a load modulation section included in the power receiving device, in a period of the power feeding to the load as the power feeding object, the power receiving control device includes a power receiving side control circuit controlling an operation of the power receiving device; and the power supply control signal output terminal for outputting the power supply control signal by which the power feeding to the load is temporarily stopped. In the device, the power receiving side control circuit turns on a switch circuit provided between an input node and an output node of the regulator, based on detection of lowering of power feeding capability to the load, so as to put a bypass path, which directly connecting the input node and the output node of the regulator, in an ON state; turns off the switch circuit so as to forcibly put the bypass path in an OFF state, in a case where the power feeding to the load is temporarily stopped in a period during which the bypass path is formed, at one of timing at which a voltage level of the power supply control signal outputted from the power supply control signal output terminal is switched from a non-active level to an active level so as to temporarily stop the power feeding to the load and timing before the power feeding to the load is temporarily stopped; and turns on the switch circuit after releasing the temporary stop of the power feeding to the load so as to return the bypass path to the ON state.

When the power receiving side control circuit included in the power receiving control device monitors the voltage level at the output node (or the input node) of the regulator and detects the lowering of capability of the power feeding to the load, for example, the power receiving side control circuit turns on the bypass path bypassing the regulator. Here, the state in which the capability of the power feeding to the load is lowered is a state, for example, in which power feeding current to the load is insufficient.

Thus the bypass path is turned on and the current is supplied to the load through the bypass path (roundabout path) with low loss, being able to easily improve the capability of the power feeding to the load. Further, heat generation at the regulator in supplying a large amount of current to the load (that is, at high load) can be suppressed.

Here, the bypass path is formed when at least one of the voltage at the input node and the voltage at the output node of the regulator is lowered, for example. Therefore, even when the current is supplied through the bypass path, excessive voltage is not applied to the load. Thus, bypassing the regulator does not cause any problem (a problem of pressure resistance, for example).

On the other hand, when the power receiving side control circuit temporarily stops the power feeding to the load, the power receiving side control circuit outputs the power supply control signal (ICUTX) from the power supply control signal output terminal. The power feeding to the load is temporarily stopped for a performance of the periodic authentication, generation of communication from the secondary side to the primary side in the normal transmission, and the like.

The power supply control signal (ICUTX) is supplied to a charging device (a charger) which controls charge for the secondary battery, for example. When the power supply control signal is switched from the non-active level to the active level, a power feeding control switch in the charging device (charger) is turned off, for example, breaking a current path.

Here, if the power feeding to the load is temporarily stopped by the power supply control signal when the bypass path is in the ON state, the current is stopped to rapidly increase the voltage level at the output node (or the input node) of the regulator, as described above, causing overshoot. In order to avoid this, the power receiving side control circuit forcibly turns off the bypass path when the circuit shifts the voltage level of the power supply control signal (ICUTX) from the non-active level to the active level (coinstantaneous timing) or at timing before the shift. Thereby, the current is supplied to the load through the regulator.

Accordingly, in the state that the bypass is forcibly turned off the power feeding to the load is temporarily stopped. The regulator has a function of stabilizing the output voltage by negative feedback control, for example. Therefore, even in the above case, the voltage at the output node (the input node) of the regulator does not excessively rise but is instantly stabilized, whereby large overshoot does not occur. Accordingly, problems such as breaking of the electronic circuit do not arise.

When the temporary stop of the power feeding to the load becomes unnecessary, the power receiving side control circuit switches the power supply control signal (ICUTX) from the active level to the non-active level so as to restart the power feeding to the load. At this time, the forcible off state of the bypass still remains. When the power feeding to the load is restarted, the transistor provided in the power feeding path of the charging device (charger) rapidly draws the current so as to supply sufficient current to the secondary battery, which is the load. Accordingly, a state like that the secondary battery and the output node of the regulator are short-circuited is produced, lowering the voltage at the output node (the input node) of the regulator.

However, the regulator has some level of ON-resistance and the current is limited by the ON-resistance, whereby no short circuit current flows. That is, there is no element limiting the current when the regulator is bypassed, whereby short circuit current flows through the bypass path. However, the ON resistance of the regulator functions as current limiting resistance when the regulator is in the ON state, preventing the flow of the short circuit current. Time period from when the power supply control signal (ICUTX) is shifted from the active level to the non-active level to when the bypass forcible off is released is short, so that a range in which the voltage at the output node of the regulator fluctuates is limited. Therefore, large undershoot does not occur. Therefore, such disadvantage, for example, that the charge control IC provided to the charging device is reset due to large undershoot does not arise.

According to the first aspect, power loss and heat generation of the power receiving device can be decreased by bypassing the regulator. Meanwhile, under the bypassing state, even when the power feeding to the load is temporarily stopped or when the power feeding, which has been stopped, is restarted, occurrence of overshoot and undershoot can be prevented. Accordingly, the power feeding capability to the load can be improved (for example, charging time for the secondary battery is shortened), and reliability according to the prevention of overshoot and undershoot can be also improved.

In the power receiving control device of the first aspect, the power receiving side control circuit may turns on the switch circuit so as to return the bypass path to the ON state after progression of time necessary for stabilizing a voltage, which is supplied to the load, after releasing the temporary stop of the power feeding to the load.

As described above, the power feeding, which has been temporarily stopped, to the load is restarted when the forcible off state of the bypass remains. In the first aspect, the forcible off state of the bypass is released after progression of time necessary for stabilizing the voltage, which is supplied to the load, so as to return the bypass to the ON state.

That is, unless a certain period of time passes after the power supply control signal is shifted from the active level to the non-active level and the power feeding to the load is restarted, the power feeding state to the load is not stabilized. During the period, the voltage at the output node (the input node) of the regulator is unstable. If the bypass is turned on under this state, power may not be stably supplied to the load.

Therefore, in the first aspect, after time which is necessary for stabilizing the power feeding voltage passes after the restart of the power feeding to the load, the bypass forcible off state is released so as to return the bypass to the ON state. Accordingly, the power supply through the bypass, which has been braked off, can be smoothly (stably) restarted, In the power receiving control device of the first aspect, the power receiving side control circuit may include: a bypass control section outputting a bypass control signal for controlling ON and OFF of the switch circuit provided between the input node and the output node of the regulator, and a periodic authentication control section: performing periodic authentication by controlling an operation of the load modulation section included in the power receiving device so as to periodically modulate the load of the power receiving device; outputting the power supply control signal from the power supply control terminal in the periodic load modulation so as to temporarily stop the power feeding to the load; and supplying a bypass forcible off signal to the bypass control section. In the power receiving control device, the bypass control section may include a detection circuit detecting a voltage level of at least a voltage at the input node and a voltage at the output node of the regulator so as to output a detection signal showing a result of the detection, and an output control circuit controlling ON and OFF of the switch circuit by switching the bypass control signal to one of an active level and a non-active level based on the detection signal outputted from the detection circuit when the bypass forcible off signal outputted from the periodic authentication control section is at a non-active level, and fixing the bypass control signal at the non-active level regardless of a level of the detection signal when the bypass forcible off signal is at an active level so as to inhibit the switch circuit from turning on.

The power receiving side control circuit includes the bypass control section and the periodic authentication control section. The bypass control section includes the detection circuit detecting at least one of the voltage at the output node and the voltage at the input node of the regulator, and the output control circuit switching the voltage level of the bypass control signal based on one of the detection signal outputted from the detection circuit and the bypass forcible off signal outputted from the periodic authentication control section.

The output control circuit controls the voltage level of the bypass control signal outputted from the bypass control section. The output control circuit functions as a bypass enabling circuit controlling ON and OFF of the bypass.

As described above, the periodic authentication is performed to detect a takeover state in the normal transmission from the power transmission device to the power receiving device. That is, the periodic authentication control section included in the power receiving side control circuit turns on/off the load modulation transistor, for example, so as to periodically modulate the load of the power receiving device. In the periodic authentication, the power feeding to the load is temporarily stopped in a period of the load modulation. The bypass needs to be turned to the OFF state when the power feeding to the load is temporarily stopped, and the OFF state of the bypass needs to be maintained until the power feeding voltage is stabilized even after the power feeding is restarted after the completion of the periodic authentication.

In order to secure the bypass off period accompanied by the periodic authentication, the periodic authentication control section generates the bypass forcible off signal to supply the signal to the bypass control section. The bypass forcible off signal outputted from the periodic authentication control section is supplied to the output control circuit in the bypass control section.

When the bypass forcible off signal is at the non-active level (that is, when the periodic authentication is not performed), the output control circuit performs control of whether the bypass control signal is outputted or not (that is, control of switching the bypass control signal to the active level or the non-active level) based on the detection signal of the detection circuit.

When the bypass forcible off signal is at the active level, the control by the bypass forcible off signal becomes mandatory, inhibiting shift of the bypass control signal to the active level (inhibiting the bypass from turning on). That is, the output control circuit forcibly fixes the bypass control signal at the non-active level regardless of the detection result, detected by the detection circuit, of the voltage level at the output node (the input node) of the regulator. Thereby, the bypass is securely turned to the OFF state in the periodic authentication. Accordingly, in the performance of the periodic authentication, overshoot or undershoot of the power feeding voltage does not occur in the power feeding path of the power receiving device.

In the power receiving control device of the first aspect, the detection circuit may set the detection signal at the active level when at least one of the voltage at the input node and the voltage at the output node of the regulator is lower than a first threshold voltage, and set the detection signal at the non-active level when the at least one of the voltage at the input node and the voltage at the output node of the regulator is higher than a second threshold voltage, which is higher than the first threshold voltage. Further, when the bypass forcible off signal outputted from the periodic authentication control section is at the non-active level, the output control circuit may set the bypass control signal at the active level and thus turn on the switch circuit in a period during which the detection signal is at the active level so as to put the bypass path in the ON state, and set the bypass control signal at the non-active level and thus turn off the switch circuit in a period during which the detection signal is at the non-active level so as to put the bypass path in the OFF state; and when the bypass forcible off signal outputted from the periodic authentication control section is at the active level, the output control circuit may fix the bypass control signal at the non-active level regardless of a level of the detection signal so as to inhibit the switch circuit from turning on.

When the detection circuit detects that the voltage at the output node (or the input node) of the regulator is decreased lower than the first threshold voltage, the bypass control section turns the bypass to the ON state, in a period in which the periodic authentication is not performed. When the detection circuit detects that the voltage at the output node (or the input node) of the regulator excesses the second threshold voltage, which is larger than the first threshold voltage, after the bypass is turned to the ON state, the bypass control section turns the bypass to the OFF state. Difference is provided between the first threshold value for ON-determination of the bypass and the second threshold value for OFF-determination of the bypass so as to prevent switching ON and OFF of the bypass caused by a noise overlapping with the power feeding path, for example. That is, once the voltage at the output node (or the input node) of the regulator is decreased and the bypass is turned to the ON state, the bypass is not turned to the OFF state unless the voltage at the output node (or the input node) of the regulator is sufficiently increased.

On the other hand, when the periodic authentication is performed, the bypass forcible off signal SA becomes the active level. Thereby, regardless of the detection result of the voltage level of the voltage, which is detected by the detection circuit, at the output node (or the input node) of the regulator, the bypass control signal is fixed at the non-active level and the bypass is forcibly turned to the OFF state, switching from the power feeding through the bypass path to the power feeding through the regulator. Accordingly, overshoot or undershoot does not occur in the periodic authentication.

In the power receiving control device of the first aspect, the detection circuit may be composed of a hysteresis comparator. Further, in a period from when the temporary stop of the power feeding to the load is released to when a bypass forcible off state is released, within the period during which the bypass path is forcibly put in the OFF state by the bypass forcible off signal outputted from the periodic authentication control section, the output control circuit may reset the hysteresis comparator serving as the detection circuit so as to return a state of an input signal and a state of an output signal of the hysteresis comparator to the state of the input signal and the state of the output signal when the bypass path is at the ON state.

The detection circuit is composed of the hysteresis comparator, for example. The hysteresis comparator is a comparator in which an input/output property with hysteresis is realized by positively feeding back an output of the comparator to an input. The output level of the hysteresis comparator depends on the input level. Therefore, in order to return the bypass to the ON state after the bypass is forcibly turned to the OFF state, the hysteresis comparator needs to be reset so as to return the state of the hysteresis comparator (that is, an input voltage, an output voltage, and the like of the hysteresis comparator) to a state corresponding to the ON state of the bypass.

However, an unstable state of the power feeding voltage caused by the temporary stop of the power feeding to the load remains until a certain period of time passes after restart of the power feeding. In a period in which the power feeding voltage is unstable, the voltage at the output node (the input node) of the regulator is also unstable, and the input voltage level of the hysteresis comparator as the detection circuit provided to the bypass control section is unstable. Therefore, the state of the hysteresis comparator may not be able to be returned to the state corresponding to the ON state of the bypass.

Therefore, the hysteresis comparator is forcibly reset. For example, in a period from when the temporary stop of the power feeding to the load is released to when the bypass forcible off state is released within the period during which the bypass path is forcibly put in the OFF state, the output control circuit forcibly lowers the input voltage level of the hysteresis comparator serving as the detection circuit so as to securely return the output voltage level to the voltage level in the ON state of the bypass. Thus, the preparation to return the bypass from the OFF state to the ON state is completed. Then, at time when the power feeding voltage is stabilized, the bypass forcible off signal is returned to the non-active level so as to return the bypass to the ON state. Thus, the bypass which has been forcibly turned off can be smoothly returned to the ON state.

A power receiving device according to a second aspect of the invention includes: the power receiving control device according to the first aspect; a power receiving section including the rectifying circuit and inverting an induced voltage of the secondary coil into a direct current voltage; and a power feeding control section including the regulator and the switch circuit, which is provided between the input node and the output node of the regulator, and controlling the power feeding to the load.

According to the second aspect, such a power receiving device for a contactless power transmission system are realized that have excellent properties such as small-size, low loss, and low heat generation and have high reliability due to no occurrence of overshoot and undershoot associated with load modulation in a normal power transmission.

An electronic apparatus according to a third aspect of the invention includes: the power receiving device according to the second aspect; and the load as the power feeding object to which electric power is fed by the power receiving device.

The present invention is applicable to various electronic devices such as watches, codeless phones, shavers, electric toothbrushes, wrist computers, handy terminals, personal digital assistants, and electric bicycles. Especially, the invention is suitably applied to mobile terminals (including a cell phone unit, a PDA terminal, and a portable personal computer terminal) or watches. The power receiving device of the aspect has a simple and small-sized structure so as to be able to be mounted on mobile terminals or the like. Further, the power receiving device operates with low loss so as to be able to reduce charging time of a secondary battery in the electronic apparatus. Yet further, heat generation in the power receiving device is reduced, so that the device is reliable from a viewpoint of a safety aspect of the electronic apparatus. In addition, overshoot and undershoot caused by the load modulation in the normal power transmission do not occur, so that a secondary side apparatus is not damaged or a circuit is not required to be reset. Accordingly, reliability of the electronic apparatus is enhanced

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the present invention will be explained in reference to the accompanying drawings.

The embodiments explained below do not unduly limit the contents of the invention described in the claims and all of the structures explained in the embodiments are not indispensable for the solving means of the invention.

First Embodiment

A contactless power transmission system will now be described.

Structure of Electronic Apparatus

Figure 1A:
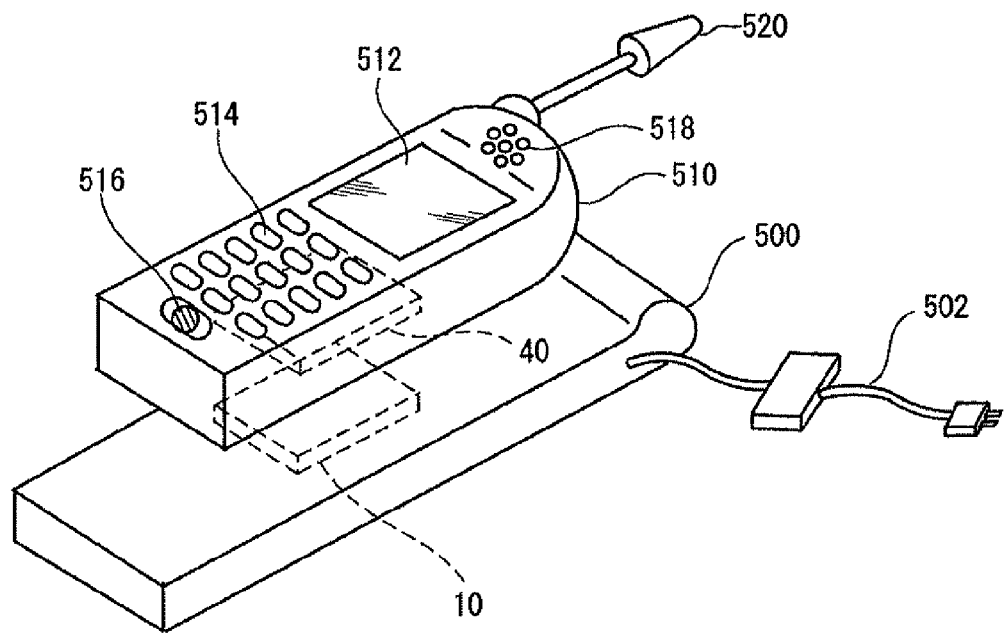
FIGS. 1A to 1C are diagrams showing an example of a structure of a contactless power transmission system.
Figure 1B:
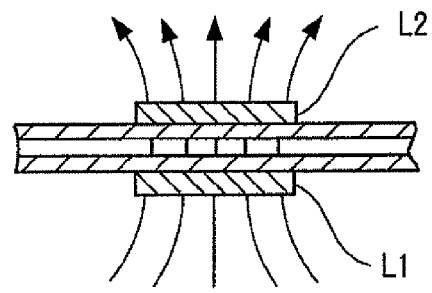
Figure 1C:
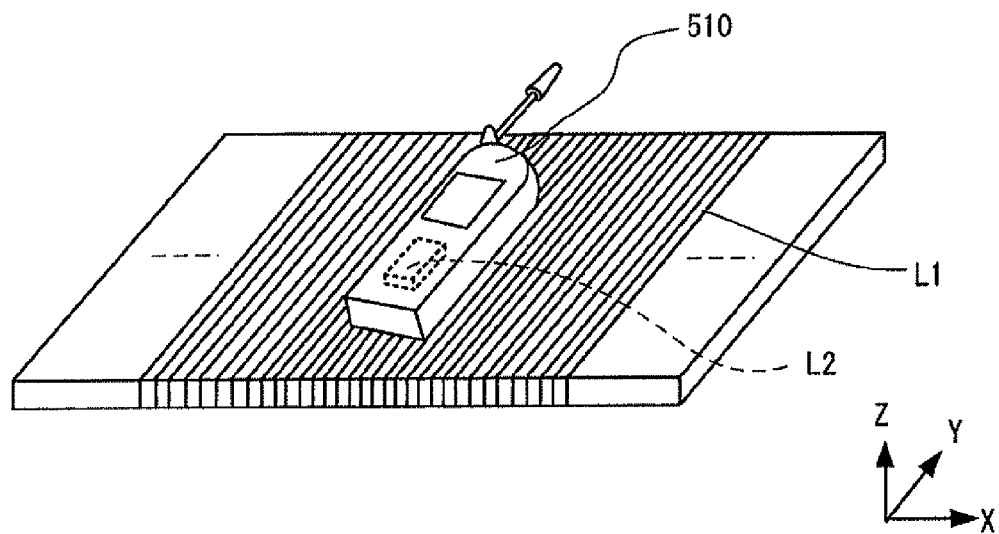

FIGS. 1A to 1C are diagrams showing an example of a structure of a contactless power transmission system. FIG. 1A shows an example of an electronic apparatus employing a contactless power transmission method according to a first embodiment of the invention. A charger 500 (a cradle) that is one of electronic apparatuses includes a power transmission device 10. A cell phone 510 that is one of electronic apparatuses includes a power receiving device 40. The cell phone 510 includes a display 512 such as a liquid crystal display (LCD), an operation section 514 composed of buttons and the like, a microphone 516 (a sound input section), a speaker 518 (a sound output section), and an antenna 520.

Power is supplied to the charger 500 through an AC adapter 502, and then the power is transmitted from the power transmission device 10 to the power receiving device 40 by the contactless power transmission. Thereby, a battery of the cell phone 510 can be charged and devices in the cell phone 510 can be operated.

Here, the electronic apparatus to which the embodiment is applied is not limited to the cell phone 510. The embodiment is applicable to various electronic apparatuses such as watches, cordless phones, shavers, electric toothbrushes, wrist computers, handy terminals, personal digital assistants, electric bicycles, and IC cards.

As schematically shown in FIG. 1B, power transmission from the power transmission device 10 to the power receiving device 40 is realized by electromagnetically coupling a primary coil L1 (a power transmission coil) provided on a power transmission device 10 side and a secondary coil L2 (a power receiving coil) provided on a power receiving device 40 side and thus forming a power transmission transformer. This realizes the contactless power transmission.

In FIG. 1B, the primary coil L1 and the secondary coil L2 are, for example, flat coils having an air-core formed by winding a coil wire on a plane in a spiral manner. However, the coils of the embodiment are not limited to these. Any coils can be used as the primary coil L1 and the secondary coil L2 regardless of their shapes, structures, and the like as long as the coils can be electromagnetically coupled to each other to transmit power.

For example, referring to FIG. 1C, the primary coil L1 is formed by winding a coil wire around a magnetic substance core in a spiral manner about an X axis. The secondary coil L2 provided to the cell phone 510 is similarly formed. The embodiment is also applicable to the coil shown in FIG. 10. Further, in a case shown in FIG. 1C, a combination of the coil obtained by winding a coil wire about the X axis and a coil obtained by winding a coil wire about a Y axis may be used as the primary coil L1 or the secondary coil L2.

The electronic apparatus to which the embodiment is applied is not limited to the cell phone 510. The embodiment is applicable to various electronic apparatuses such as watches, cordless phones, shavers, electric toothbrushes, wrist computers, handy terminals, personal digital assistants, and electric bicycles.

Especially, the embodiment is suitably applied to mobile terminals (including a cell phone unit, a PDA terminal, and portable personal computer terminal) or watches. The power receiving device of the embodiment has a simple and small-sized structure so as to be able to be mounted on mobile terminals or the like. Further, the power receiving device operates with low loss so as to be able to reduce charging time for a secondary battery in the electronic apparatus. Yet further, heat generation in the power receiving device is reduced, so that the device is reliable from a viewpoint of a safety aspect of the electronic apparatus.

Especially, in mobile terminals (including a cell phone unit, a PDA terminal, and portable personal computer terminal), an amount of charging current under high load is large, easily causing a problem of heat generation. Watches are rigorously required to have a small size and low power consumption, so that a low loss characteristic of a battery at charging time is very important. Accordingly, these apparatuses can sufficiently take advantage of characteristics such as low loss and low heat generation of the embodiment.

Example of Structure of Power Transmission Device and Power Receiving Device

Figure 2:
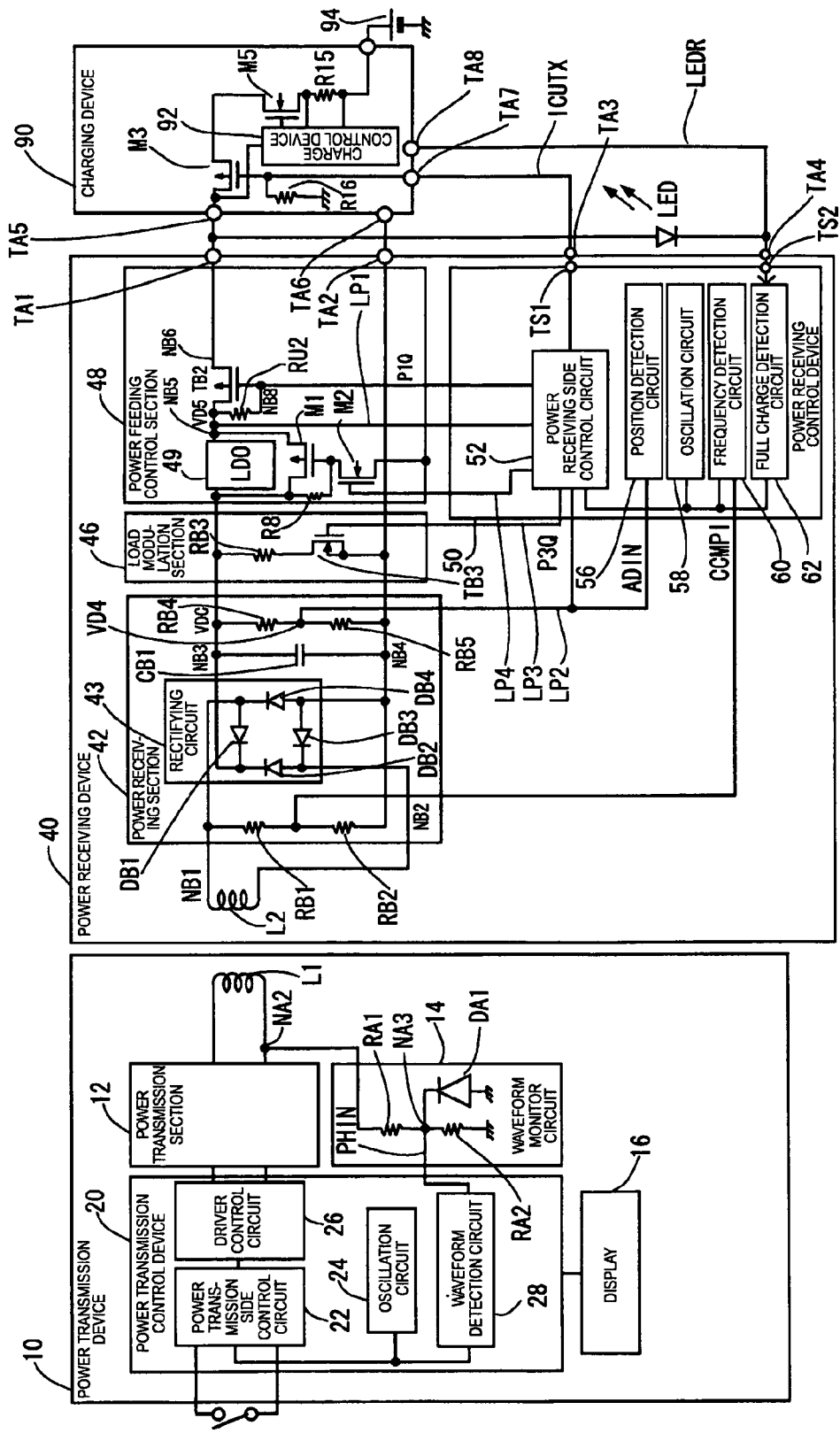
FIG. 2 is a circuit diagram showing an example of a specific structure of each part in the contactless power transmission system including a power transmission device and a power receiving device.

FIG. 2 is a circuit diagram showing an example of a specific structure of each part in the contactless power transmission system including the power transmission device and the power receiving device.

The power transmission device 10 includes a power transmission control device 20, a power transmission section 12, a waveform monitor circuit 14, and a display 16. The power transmission control device 20 includes a power transmission side control circuit 22, an oscillation circuit 24, a driver control circuit 26, and a waveform detection circuit 28.

The power receiving device 40 includes a power receiving section 42, a load modulation section 46, a power feeding control section 48, and a power receiving control device 50. A load, which is an object of power feeding, in the contactless power transmission system is a secondary battery (a lithium-ion battery, for example) 94. Charging of the secondary battery 94 is controlled by a charging device (charger) 90. Hereinafter, the details are described.

An electronic apparatus such as the charger 500 at a power transmission side includes at least the power transmission device 10 shown in FIG. 2. An electronic apparatus such as the cell phone 510 at a power receiving side includes at least the power receiving device 40, the charging device 90, and a load 94 which is the object of the power feeding.

Based on the structure shown in FIG. 2, such a contactless power transmission (non-contact power transmission) system is realized that the primary coil L1 and the secondary coil L2 are electromagnetically coupled to each other to transmit power from the power transmission device 10 to the power receiving device 40 and thus supply the power to the load 94 from a voltage output terminal TA1 of the power receiving device 40.

The power transmission device (a transmission module or a primary module) 10 may include the primary coil L1, the power transmission section 12, the waveform monitor circuit 14, the display 16, and the power transmission control device 20. Here, the structures of the power transmission device 10 and the power transmission control device 20 are not limited to those shown in FIG. 2, and various modifications, such as omitting a part of components (the display and the waveform monitor circuit, for example), adding other components, and changing connecting relationship, can be made.

The power transmission section 12 generates an alternating current voltage having a predetermined frequency during power transmission, and generates an alternating current voltage having a frequency, which varies in accordance with data, during data transfer so as to supply the voltage to the primary coil L1. The power transmission section 12 may include a first power transmission driver driving one end of the primary coil L1, a second power transmission driver driving the other end of the primary coil L1, and at least one capacitor forming a resonance circuit together with the primary coil L1. Each of the first and second power transmission drivers included in the power transmission section 12 is an inverter circuit (or a buffer circuit) configured of, for example, a power metal-oxide semiconductor (power MOS) transistor, and is controlled by the driver control circuit 26 of the power transmission control device 20.

The primary coil L1 (a coil used on the power transmission side) and the secondary coil L2 (a coil used on the power receiving side) are electromagnetically coupled to each other so as to form a power transmission transformer. For example, when the power transmission is required, as shown in FIGS. 1A to 1C, the cell phone 510 is placed on the charger 500 so that magnetic flux of the primary coil L1 passes through the secondary coil L2. On the other hand, when the power transmission is not required, the cell phone 510 is physically separated from the charger 500 so that magnetic flux of the primary coil L1 does not pass through the secondary coil L2.

As the primary coil L1 and the secondary coil L2, flat coils may be used, for example. The waveform monitor circuit 14 detects induced voltage of the primary coil L1, and includes a diode DA1 provided between a resistance RA1, a resistance RA2, or a connection node NA3 for the resistances RA1 and RA2 and ground GND (a power source at a low potential side, in the broad sense). Concretely, a signal PHIN obtained by dividing the induced voltage of the primary coil by the resistances RA1 and RA2 is inputted into the waveform detection circuit 28 of the power transmission control device 20.

The display 16 displays various states (a power transmission state, an ID authenticating state, or the like) of the contactless power transmission system with a color or an image, and is realized by a light-emitting diode (LED) or a liquid crystal display (LCD) device, for example.

The power transmission control device 20 performs various controls of the power transmission device 10, and can be realized by an integrated circuit (IC) device or the like. The power transmission control device 20 includes the power transmission side control circuit 22, the oscillation circuit 24, the driver control circuit 26, and the waveform detection circuit 28.

The power transmission side control circuit 22 is adapted to control the power receiving device 10 and the power transmission control device 20, and can be realized by a gate array or a microcomputer, for example.

Concretely, the power transmission side control circuit 22 conducts various sequence controls and determination processings required for power transmission, load detection, frequency modulation, foreign object detection, or attachment/detachment detection. The power transmission side control circuit 22 starts temporary power transmission for positional detection or ID authentication with respect to the power receiving device 40 when an operational switch is turned on, for example.

The oscillation circuit 24 is composed of a crystal oscillation circuit, for example, and generates a clock (a driving clock DRCK) at the primary side. The driver control circuit 26 generates a control signal having a desired frequency based on the clock generated at the oscillation circuit 24, a frequency setting signal from the control circuit 22, and the like and outputs the control signal to a power transmission driver (not shown) of the power transmission section 12 so as to control an operation of the power transmission driver.

The waveform detection circuit 28 monitors a waveform of the signal PHIN corresponding to an induced voltage of one end of the primary coil L1 so as to perform load detection, foreign object detection, and the like. For example, when the load modulation section 46 of the power receiving device 40 performs load modulation for transmitting data to the power transmission device 10, a waveform of a signal of the induced voltage of the primary coil L1 varies in a corresponding manner to the load modulation.

For example, if the load modulation section 46 of the power receiving device 40 decreases a load so as to transmit data "0", amplitude (peak voltage) of the waveform of the signal becomes small. On the other hand, if the load modulation section 46 increases a load so as to transmit data "1", amplitude of the waveform of the signal becomes large. Accordingly, the waveform detection circuit 28 performs peak hold processing of the waveform of the signal of the induced voltage and thus determines whether a peak voltage excesses a threshold voltage or not, thereby being able to determine that the data from the power receiving device 40 is "0" or "1".

Here, the method of waveform detection is not limited to the above-mentioned method. For example, whether a load at the power receiving side is increased or decreased may be determined by using physical quantity (phase difference between current and voltage, a pulse width of a pulse generated based on a voltage waveform, or the like) other than the peak voltage.

The power receiving device 40 (a power receiving module or a secondary module) may include the secondary coil L2, the power receiving section 42, the load modulation section 46, the power feeding control section 4S, and the power receiving control device 50. Note that the structure of the power receiving device 40 and that of the power receiving control device 50 are not limited to those shown in FIG. 2, and various modifications such as omitting a part of components, adding other components, and changing a connecting relationship, can be made.

The power receiving section 42 converts an alternating induced voltage of the secondary coil L2 into a direct-current voltage. This conversion is performed by a rectifying circuit 43 included in the power receiving section 42. The rectifying circuit 43 includes diodes DB1 through DB4. The diode DB1 is provided between a node NB1 at one end of the secondary coil L2 and a generation node NB3 of a direct current voltage VDC. The diode DB2 is provided between the node NB3 and the node NB2 at the other end of the secondary coil L2. The diode DB3 is provided between the node NB2 and a node NB4 of a VSS. The diode DB4 is provided between the node NB4 and the node NB1.

Resistances RB1 and RB2 of the power receiving section 42 are provided between the node NB1 and the node NB4. A signal CCMPI obtained by dividing a voltage between the nodes NB1 and NB4 by means of the resistances RB1 and RB2 is inputted into a frequency detection circuit 60 of the power receiving control device 50.

L A capacitor CB1 and resistances RB4 and RB5 of the power receiving section 42 are provided between the node NB3 of the direct current voltage VDC and the node NB4 of the VSS. A divided voltage VD4 obtained by dividing a voltage between the nodes NB3 and NB4 by means of the resistances RB4 and RB5 is inputted into a power receiving side control circuit 52 and a position detection circuit 56 through a signal line LP2. According to the position detection circuit 56, the divided voltage VD4 is an input signal (ADIN) for positional detection.

The load modulation section 46 performs load modulation processing. Specifically, when desired data is transmitted from the power receiving device 40 to the power transmission device 10, a load on the load modulation section 46 (the secondary side) is variably changed so as to change a signal waveform of the induced voltage of the primary coil L1. Therefore, the load modulation section 46 includes a resistance RB3 and a transistor TB3 (an N-type CMOS transistor) that are provided in series between the nodes NB3 and NB4.

The transistor TB3 is on/off controlled by a control signal P3Q supplied from the power receiving side control circuit 52 of the power receiving control device 50 through a signal line LP3. In an authentication stage before start of a main transmission, the load modulation transistor TB3 is on/off controlled and load modulation is thus performed, so as to transmit a signal to the power transmission device.

For example, in a case where the secondary side is set to be in a low load state (large impedance) in order to transmit data "0", the load modulation transistor TB3 is turned off due to the driving signal P3Q, which is at a "L" level, of the load modulation transistor TB3. Accordingly, the load of the load modulation section 46 becomes approximately infinite (no load). On the other hand, in a case where the secondary side is set to be in a high load state (small impedance) in order to transmit data "1", the load modulation transistor TB3 is turned on due to the driving signal P3Q, which is at a "H" level, of the load modulation transistor TB3. Thus, the load of the load modulation section 46 is the resistance RB3 (high load).

The power feeding control section 48 controls power feeding to the load 94 which is an object of the power feeding. A regulator (LDO) 49 regulates a voltage level of a direct current voltage VDC obtained by the conversion performed by the rectifying circuit 43, so as to generate a power source voltage VD5 (5V, for example) The power source voltage VD5 is a voltage at an output node of the regulator (LDO) 49. The power receiving control device 50 operates with the power source voltage VD5.

Between an input node and the output node of the regulator (LDO) 49, a switch circuit composed of a PMOS transistor (M1) is provided. By turning on the PMOS transistor (M1) as the switch circuit, a path bypassing the regulator (LDO) 49 is formed. For example, in a high load state (for example, at the beginning of charging of a secondary battery with high exhaustion which needs to be supplied with great current approximately constantly), power loss is increased due to equivalent impedance of the regulator 49 and heat generation is also increased. Therefore, current is supplied to the load through the bypass while circumventing the regulator.

In order to on/off control the PMOS transistor M1 as the switch circuit, an NMOS transistor M2 functioning as a bypass control circuit and a pull-up resistance R8 are provided.

When a bypass control signal VPBP at a high level is supplied from the power receiving side control circuit 52 through a signal line LP4 to a gate of the NMOS transistor M2, the NMOS transistor M2 is turned on. Then a gate of the PMOS transistor M1 turns into a low level, and thereby the PMOS transistor M1 is turned on, forming the path bypassing the regulator (LDO) 49. On the other hand, when the NMOS transistor M2 is at an OFF state, the gate of the PMOS transistor M1 is maintained at the high level via the pull-up resistance R8. Accordingly, the PMOS transistor M1 is turned off, and therefore the bypass path is not formed.

ON/OFF of the bypass path (that is, turning-on/off of the NMOS transistor M2) is controlled by the power receiving side control circuit 52 included in the power receiving control device 50. A structure and an operation of the power receiving side control circuit 52 related to ON/OFF of the bypass will be described later.

A transistor TB2 (a P-type CMOS transistor) is provided between a generating node NB5 (an output node of the regulator 49) of the power source voltage VD5 and a transistor TB1 (a node NB6), and is controlled by a signal P1Q from the power receiving side control circuit 52 of the power receiving control device 50. Specifically, the transistor TB2 is turned on when normal power transmission is carried out after completion (conclusion) of ID authentication.

Between the power source voltage generation node NB5 and a node NB8 at a gate of the transistor TB2, a pull-up resistance RU2 is provided.

The power receiving control device 50 performs various controls of the power receiving device 40, and can be realized by an integrated circuit (IC) device or the like. The power receiving control device 50 can be operated by the power source voltage VD5 generated from the induction voltage of the secondary coil L2. The power receiving control device 50 may include the power receiving side control circuit 52, the position detection circuit 56, the oscillation circuit 58, the frequency detection circuit 60, and a full charge detection circuit 62.

The power receiving side control circuit 52 controls the power receiving device 40 and the power receiving control device 50, and can be realized by, for example, a gate array or a microcomputer. The power receiving side control circuit 52 operates by using a constant voltage (VD5) at the output node of the series regulator (LDO) 49 as a power source. The power source voltage (VD5) is supplied to the power receiving side control circuit 52 through a power source supply line LP1.

The power receiving side control circuit 52 performs various sequence controls and determination processings that are required for ID authentication, positional detection, frequency detection, full charge detection, load modulation for communication for authentication, load modulation for communication enabling detection of foreign object insertion, and the like.

The power receiving side control circuit 52 is provided with a power supply control signal output terminal TS1 which is used for outputting a power supply control signal (ICUTX) for temporarily stopping the power feeding to the load 94 in a normal transmission. The power supply control signal (ICUTX) becomes at an active level in a period of a performance of the load modulation (that is, a period in which the load modulation transistor TB3 is turned on/off). The power supply control signal (ICUTX) is provided to the charging device 90. Namely, the power supply control signal (ICUTX) is supplied to the charging device 90 through the power supply control signal output terminal TS1, a terminal TA5 provided to the power receiving device (power receiving module) 40, and a terminal TA7 provided to the charging device 90.

The charging device 90 is provided with a power supply control transistor (PMOS transistor) M3. A gate of the power supply control transistor (PMOS transistor) M3 is grounded by a pull down resistance R16 in a normal state. Therefore, the power supply control transistor (PMOS transistor) M3 is at an ON state. Thus, current is supplied to the secondary battery (load which is the object of the power feeding) 94 through the power supply control transistor (PMOS transistor) M3 in the normal state.

When the power supply control signal (ICUTX) outputted from the power supply control signal output terminal TS1 of the power receiving side control circuit 52 is at an active level (H level), the gate of the power supply control transistor (PMOS transistor) M3 of the charging device 90 becomes a high level and therefore the power supply control transistor M3 is turned off. Accordingly, the power feeding to the secondary battery (load) 94 is temporarily stopped. When the power supply control signal (ICUTX) is at a non-active level (L level), the power supply control transistor (PMOS transistor) M3 returns to the ON state.

The position detection circuit 56 monitors a waveform of the signal ADIN corresponding to a waveform of the induction voltage of the secondary coil L2 so as to determine whether a positional relationship between the primary coil L1 and the secondary coil L2 is adequate. Concretely, adequacy of the positional relationship is determined by converting the signal ADIN into a binary signal.

The oscillation circuit 58 is composed of, for example, a CR oscillation circuit and generates a clock of the secondary side. The frequency detection circuit 60 detects a frequency (f1, f2) of the signal CCMPI so as to determine whether transmission data from the power transmission device 10 is "1" or "0".

To the full charge detection circuit 62 (charge detection circuit), a signal LEDR outputted from a charge control device 92 which is included in the charging device 90 is inputted via a terminal TA4 and a terminal TS2. The charge control device 92 monitors a charging state of the secondary battery 94 which is the load as the power feeding object, and detects full charge of the secondary battery 94 depending on whether the charging state satisfies a predetermined condition (for example, a condition in which a state, in which a current has a value equal to or less than a predetermined value, is continued under a voltage of 4.2V in a predetermined period of time). When the charge control device 92 detects full charge, the device 92 shifts the signal LEDR from the H level to the L level. Thereby, a light emitting diode (LED) used for displaying the charging state is forwardly biased so as to light up. Further, the full charge detection circuit 62 can recognize that the secondary battery 94 becomes at a full charge state, based on a shift of the voltage level of the signal LEDR.

The charging device 90 includes the power supply control transistor (PMOS transistor) M3; the charge control device 92 performing, for example, charging control of the secondary battery 94 which is the load as the power feeding object; a charge control transistor MS; and a current detection resistance R15. The charge control device 92 detects a potential across the current detection resistance R15, for example, and performs negative feedback control based on the detection result. Thereby, the device 92 controls an ON state of the charge control transistor MS so as to stabilize charge current (or stabilize charge voltage), for example. Further, the charge control device 92 can detect a full charge state of the secondary battery 94, as described above. The charge control device 92 (a charge control IC) can be realized by an integrated circuit device or the like.

The power receiving device 40 includes four terminals (TA1 to TA4). The charging device (charger) 90 also includes four terminals (TA5 to TA8). The power receiving control device 50 includes two terminals (the output terminal TS1 for the signal ICUTX and the input terminal TS2 for the signal LEDR). Here, the load as the power feeding object is not limited to the secondary battery. For example, a predetermined circuit can be a load due to its operation.

Detection of a takeover state (a measure of takeover heat generation) will now be described concretely.

Description of Communication System

Figure 3A:
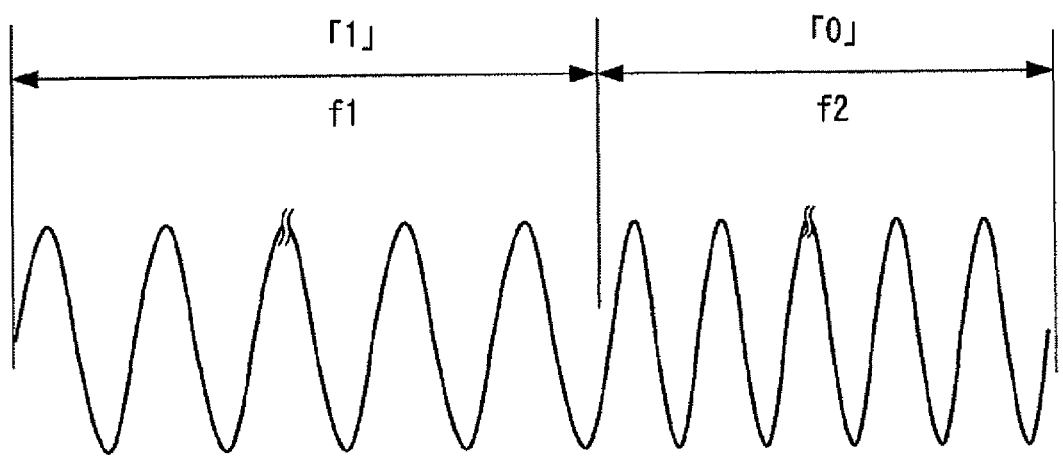
FIGS. 3A and 3B are diagrams for explaining a communication system between the power transmission device and the power receiving device.
Figure 3B:
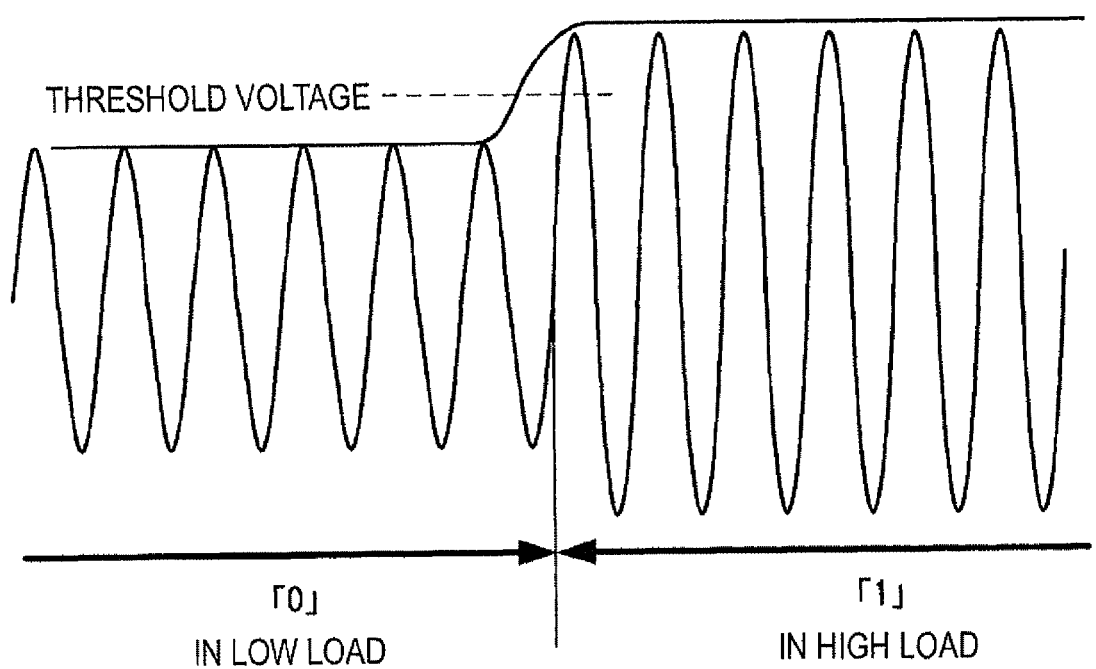

FIGS. 3A and 3B are diagrams for explaining a communication system between the power transmission device and the power receiving device. FIG. 3A shows a communication system in a case where a signal is transmitted from the power transmission device to the power receiving device (frequency modulation). FIG. 3B shows a communication system in a case where a signal is transmitted from the power receiving device to the power transmission device (load modulation).

The power transmission device can transmit data "1" and "0" to the power receiving device by switching a transmission frequency between f1 and f2 by frequency modulation as shown in FIG. 3A.

On the other hand, the power receiving device can transmit data "0" and "1" to the power transmission device by modulating a load thereof as shown in FIG. 3B. That is, when the load modulation transistor TB3 included in the load modulation section 46 is turned on/off, a coil end voltage of the primary coil L1 is varied as shown in FIG. 3B, for example. Thereby, the power transmission side control circuit 22 can detect whether the load modulation signal is "0" or "1" by comparing a voltage at a coil end (node NA2) of the primary coil L1 with a threshold voltage.

Periodic Authentication and Load Reduction

Figure 4A:
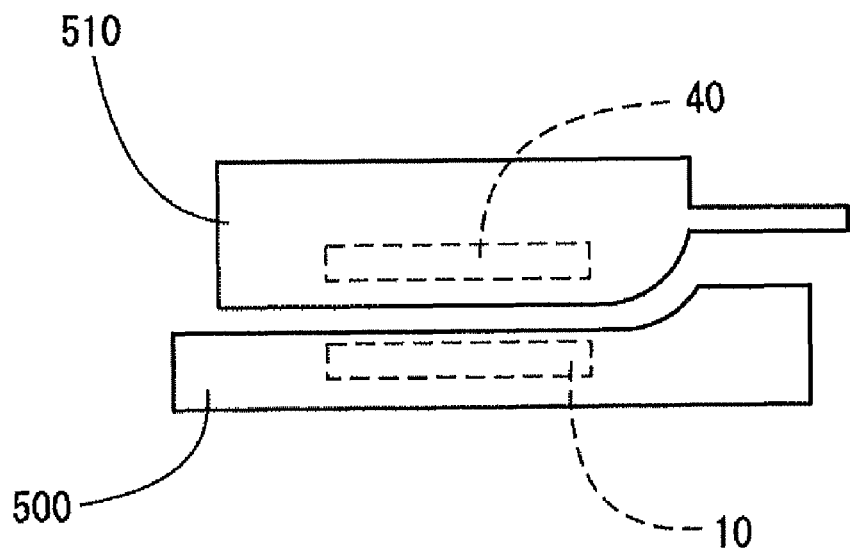
FIGS. 4A and 4B are diagrams for explaining a takeover state.
Figure 4B:
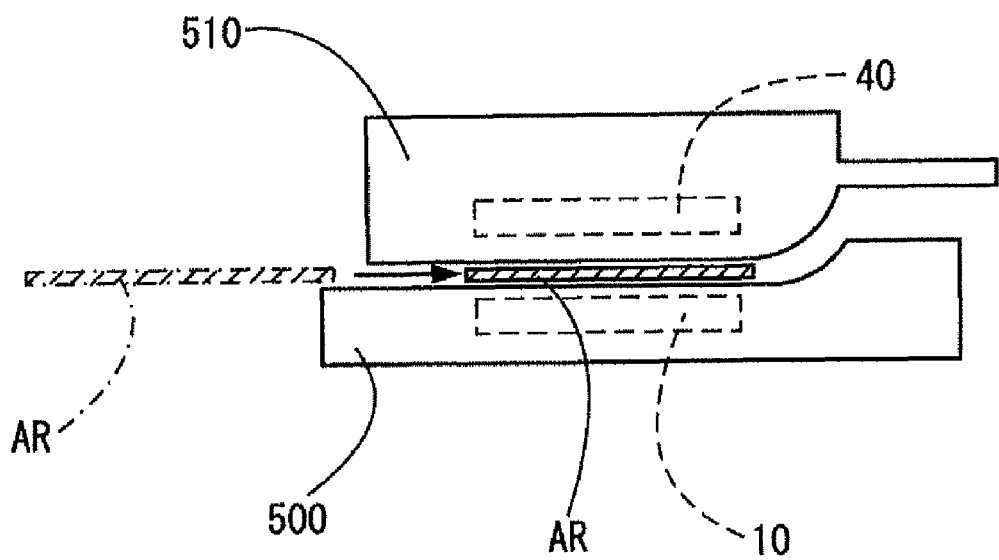

Periodic authentication for detecting a takeover state and load reduction (temporary stop of power feeding to a load) associated with the periodic authentication will now be described. FIGS. 4A and 4B are diagrams for explaining a takeover state.

FIG. 4A shows a state that normal power transmission (regular power transmission after ID authentication) is performed from the power transmission device 10 to the power receiving device 40. As shown in FIG. 4B, when a metal foreign object AR having a thin plate like shape and a large area, for example, is inserted between a primary side device 500 and a secondary side device 510, the whole power supplied from the primary side is consumed at the metal foreign object AR.

The primary side device determines that the secondary side device exists, and therefore the normal power transmission is continued. This state is called a "takeover state". If the takeover state arises, the metal foreign object (conductive foreign object) AR generates heat so as to cause accidents such as device damage and burn injury.

Therefore, the secondary side device periodically (every second, for example) transmits a signal having a predetermined pattern ("0", "1", "0", for example) by load modulation. If the takeover state does not occur, the primary side device can periodically detect a signal having a predetermined pattern and transmitted from the secondary side device. On the other hand, if the takeover state occurs, the primary side device can not detect the signal having a predetermined pattern and transmitted from the secondary side device, thereby being able to detect the occurrence of the takeover state. The detection of the takeover state depending on whether the signal periodically transmitted from the secondary side device can be received or not is referred to as periodic authentication.

Figure 5A:
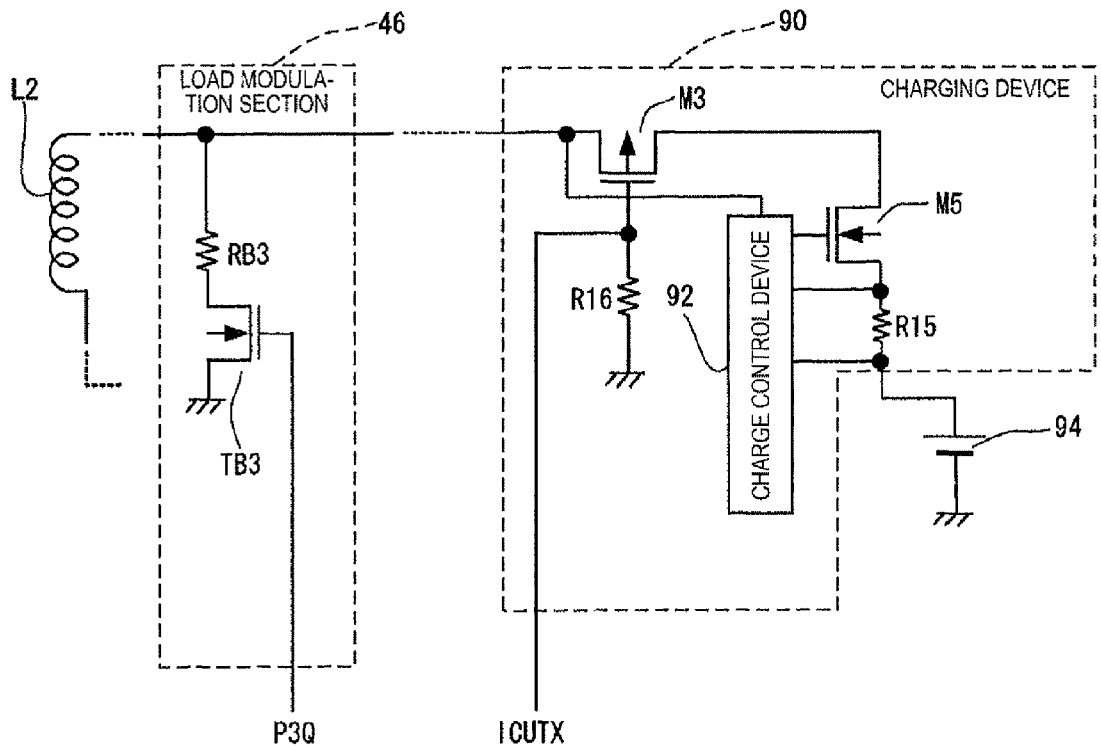
FIGS. 5A and 5B are diagrams for explaining periodic authentication and load reduction (temporary stop of power feeding to a load) in the periodic authentication.
Figure 5B:
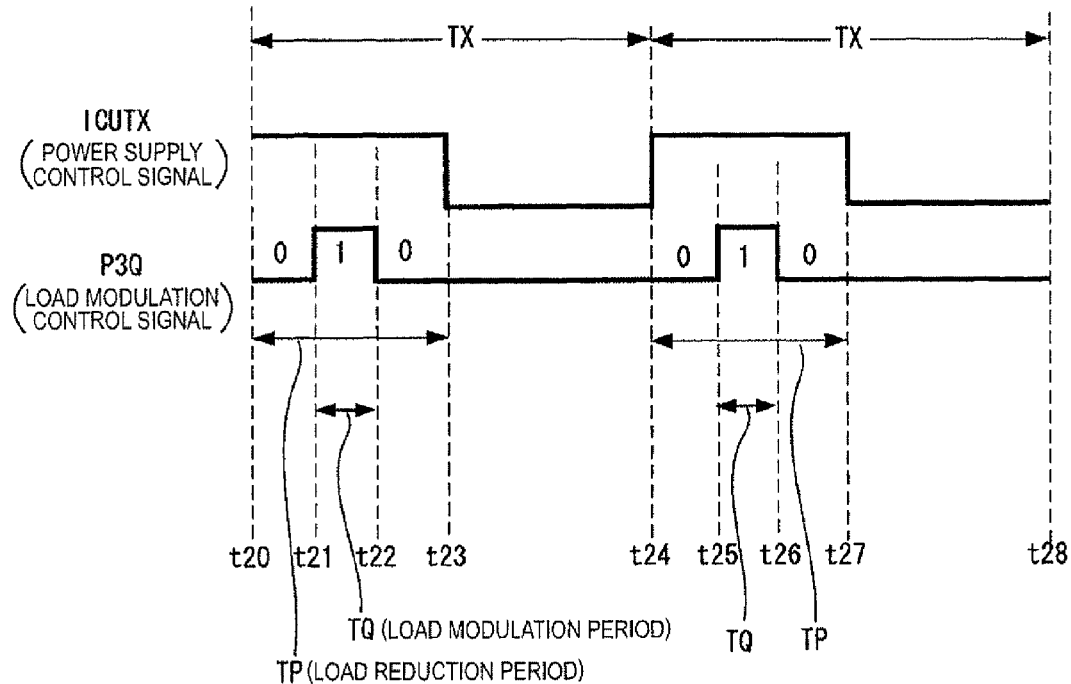

FIGS. 5A and 5B are diagrams for explaining periodic authentication and load reduction (temporary stop of power feeding to a load) in the periodic authentication.

The power receiving side control circuit 52 temporarily stops the power feeding to the load (secondary battery) 94 when performing load modulation (performing periodic authentication, for example). That is, in a case where an amount of charging current to the load (secondary battery) 94 is large, the primary side device sometimes can not precisely detect the load modulation signal, which is transmitted from the secondary side device to the primary side device due to turning on/off of the load modulation transistor TB3. Therefore, the power feeding to the load 94 is temporarily stopped in the load modulation period (this operation is referred to as load reduction). Here, the period in which the power feeding is temporarily stopped is substantially short, so that such a disadvantage that long charging time to the load (secondary battery) 94 is required does not arise.

The power receiving side control circuit 52 outputs the power supply control signal (ICUTX) through power supply control signal output terminal TS1 provided to the power receiving control device 50, in a case where the power feeding to the load (secondary battery) 94 is temporarily stopped.

The power feeding to the load (secondary battery) 94 is temporarily stopped for a performance of the periodic authentication for detecting the takeover state, generation of communication by load modulation from the secondary side to the primary side in the normal transmission (for example, communication for informing full charge of the secondary battery 94), and the like.

The power supply control signal (ICUTX) is supplied to the charging device (charger) 90 which controls charge for the secondary battery, for example. When the power supply control signal (ICUTX) shifts from the non-active level (L level) to the active level (H level), the power supply control transistor (PMOS transistor) M3 in the charging device (charger) is turned off, cutting off a current path to the load 94.

That is, as shown in FIG. 5A, when the load modulation transistor TB3 in the load modulation section 46 is turned on/off by the load modulation control signal P3Q, the power supply control signal (ICUTX) becomes the active level (H level), turning off the power supply control transistor (PMOS transistor) M3. Accordingly, the power feeding to the load (secondary battery) 94 which is the power feeding object is temporarily stopped.

Referring to FIG. 5B, TX denotes one period of the periodic authentication. TQ denotes a load modulation period and TP denotes a load reduction period (a temporary stopping period of the power feeding). As shown in FIG. 5B, the load reduction is performed in the period TP during which the power supply control signal (ICUTX) is active (from time t20 to time t23), and data "0", "1", "0" is transmitted to the power transmission device. The load modulation is performed in the load modulation period TQ (from time t21 to time t22).

A specific example of a bypass control in the power receiving device will now be described.

Example of Bypass Control in Power Receiving Device

Figure 6:
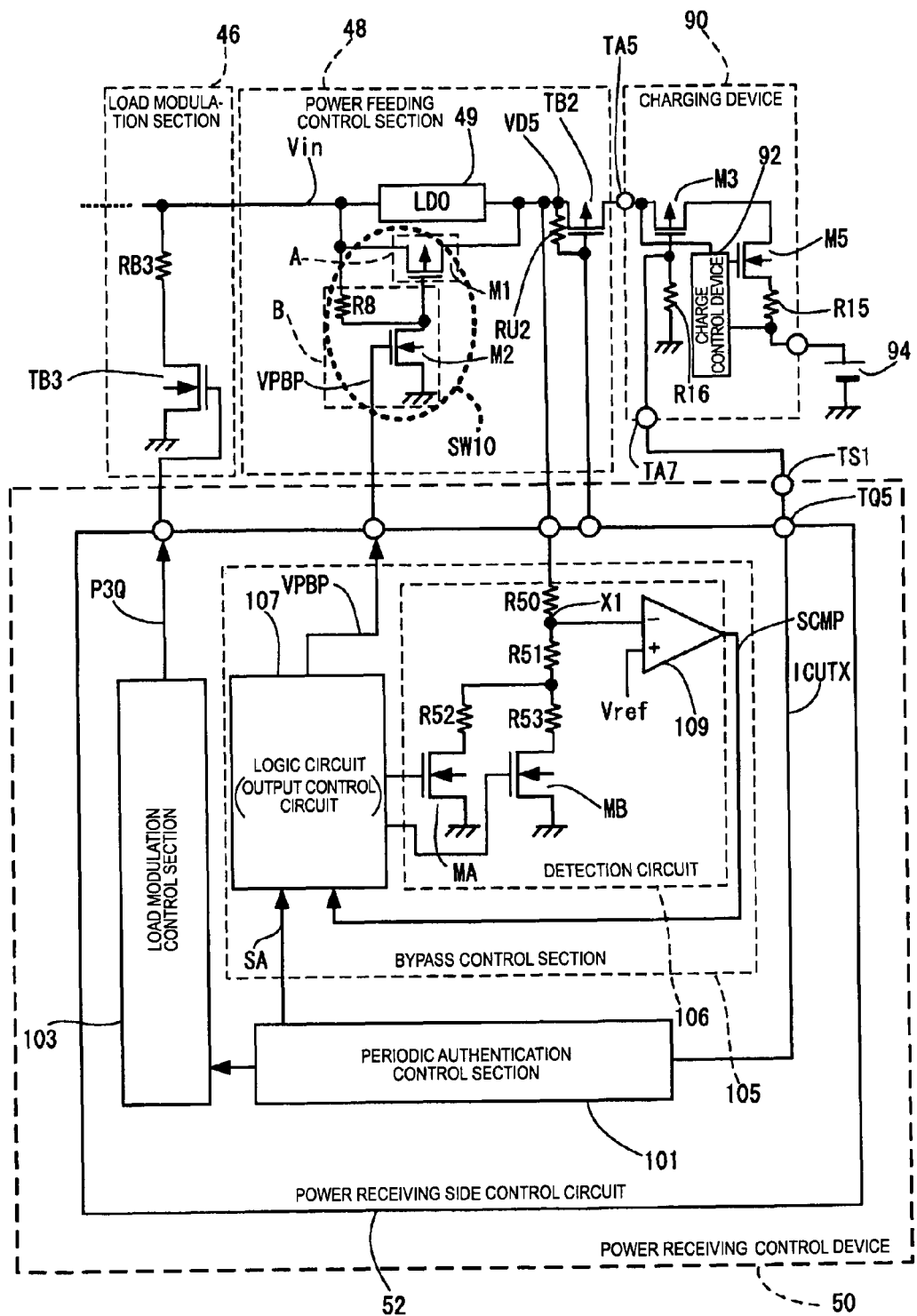
FIG. 6 is a diagram showing a structure of a part related to bypass control in the power receiving device.

FIG. 6 is a diagram showing a structure of a part related to bypass control in the power receiving device. As shown in FIG. 6, the power receiving side control circuit 52 included in the power receiving control device 50 includes a periodic authentication control section 101, a load modulation control section 103, and a bypass control section 105.

To the power feeding control section 48 of the power receiving device, a bypass control switch A and a control circuit B for the bypass control switch A are provided. The bypass control switch A is composed of the PMOS transistor M1 The control circuit B for the bypass control switch is composed of the NMOS transistor M2 and the pull-up resistance R8. The bypass control switch A and the control circuit B for the bypass control switch constitute a switch circuit SW10 for turning on/off the bypass path.

The bypass control section 105 includes a detection circuit 106 and a logic circuit (output control circuit) 107. The detection circuit 106 detects at least one of the voltage VD5 at the output node of the regulator (LDO) 49 and the voltage Vin at the input node. The logic circuit 107 switches a voltage level of the bypass control signal VPBP based on one of a detection signal (comparator output) SCMP outputted from the detection circuit 106 and a bypass forcible off signal SA outputted from the periodic authentication control section 101.

The detection circuit 106 is composed of a hysteresis comparator, for example. The detection circuit 106 shown in FIG. 6 includes a comparator 109, division resistances R50 to R53, and transistors MA and MB for switching a threshold value of the comparator. A voltage of a common connecting point X1 of the division resistances R50 and R51 is supplied to an inverting terminal of the comparator 109, and a reference voltage Vref (1.3V, for example) is supplied to a non-inverting terminal. A resistance value of the resistance R52 is set to be larger than a resistance value of the resistance R53.

The periodic authentication control section 101 instructs the load modulation control section 103 to periodically turn on/off the load modulation transistor TB3 and transmit the load modulation signal (010) to the primary side. Further, the periodic authentication control section 101 outputs the power supply control signal (ICUTX) to the charging device 90 via a terminal TQ5 provided to the power receiving side control circuit 52 and a power supply control signal output terminal TS1 provided to the power receiving control device 50, so as to temporarily stop the power feeding to the load 94.

The periodic authentication control section 101 supplies the bypass forcible off signal SA to the logic circuit (output control circuit) 107 of the bypass control section 105.

When the bypass forcible off signal SA is at the non-active level (that is, when the periodic authentication is not performed), the logic circuit (output control circuit) 107 of the bypass control section 105 performs control of whether the bypass control signal (VPBP) is outputted or not (that is, control of switching the bypass control signal VPBP to an active level or a non-active level) based on the detection signal (SCMP) of the detection circuit 106.

When the bypass forcible off signal SA is at the active level, control by the bypass forcible off signal SA becomes mandatory, whereby the logic circuit (output control circuit) 107 inhibits an output of the bypass control signal VPBP. That is, the bypass control signal VPBP is forcibly fixed at the non-active level regardless of the voltage level, according to the detecting circuit 106, of the voltage VD5 at the output node of the regulator 49. Accordingly, a bypass off period associated with the periodic authentication is secured, and therefore overshoot and undershoot of the voltage in the power feeding path in the power receiving device do not occur when the periodic authentication is performed.

Operation and the like of the bypass control section 105 will now be described concretely.

The bypass control section 105 included in the power receiving side control circuit 52 monitors a voltage level of the voltage VD5 at the output node (or a voltage Vin at the input node) of the regulator 49, for example. This monitoring of the voltage level is performed by the detection circuit 106.

When the voltage VD5 at the output node of the regulator 49 rises, the voltage Vin at the input node also rises, whereby either of the voltages may be monitored. However, a purpose of the voltage monitoring is to detect depression of power feeding capability to the load (secondary battery) 94 which is the power feeding object. Therefore, a voltage at a node closer to the load 94 (that is, the voltage VD5 at the output node of the regulator 49) is preferably monitored. Alternatively, both of the voltage Vin and the voltage VD5 of the regulator 49 can be monitored. In the following description, the voltage VD5 at the output node of the regulator 49 is detected.

Lowering of the voltage level of the voltage VD5 at the output node of the regulator (LDO) 49 is detected by the detection circuit 106. When the voltage (power source voltage) VD5 at the output node of the regulator 49 becomes lower than a predetermined threshold voltage (4.9V, for example), the logic circuit (output control circuit) 107 included in the bypass control section 105 determines that the power feeding capability to the load 94 is depressed. Then the logic circuit 107 shifts the bypass controlling signal VPBP to the active level (H level) so as to turn on (conduct) a bypass path bypassing the regulator 49 (a roundabout path passing through the bypass transistor M1).

Thus current is supplied to the load 94 through the bypass path (roundabout path) with low loss, being able to improve the power feeding capability to the load 94 with ease. Further, heat generation at the regulator 49 in supplying a large amount of current to the load 94 (that is, at high load) can be suppressed. The bypass path is formed when the voltage at the input node (or the output node) of the regulator 49 is lowered. Accordingly, even when current is supplied through the bypass path, excessive voltage is not applied to the load 94. Thus, bypassing the regulator 49 does not cause any problem.

On the other hand, the power receiving side control circuit 52 temporarily stops the power feeding to the load 94 when the load modulation is performed, as described above.

Figure 7A:
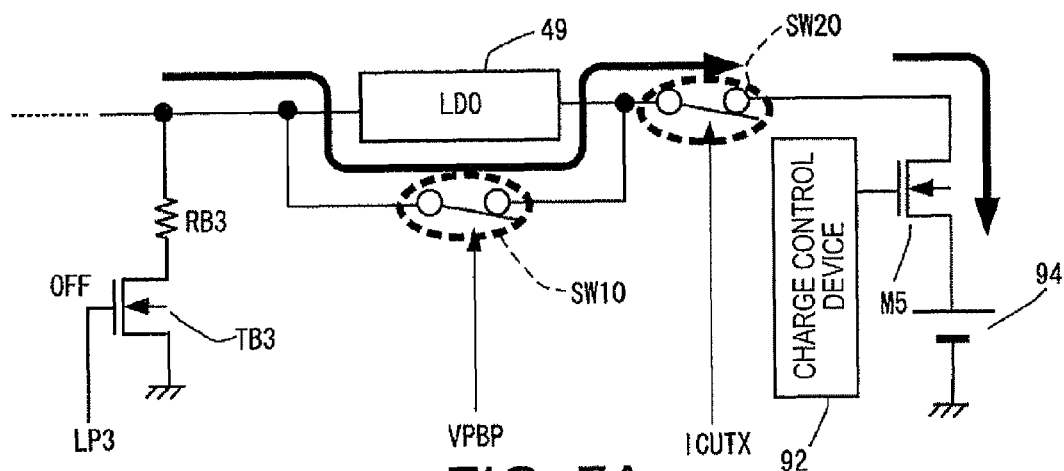
FIGS. 7A to 7C are diagrams for explaining problems arising when the power feeding to the load is temporarily stopped in an ON state of the bypass path.
Figure 7B:
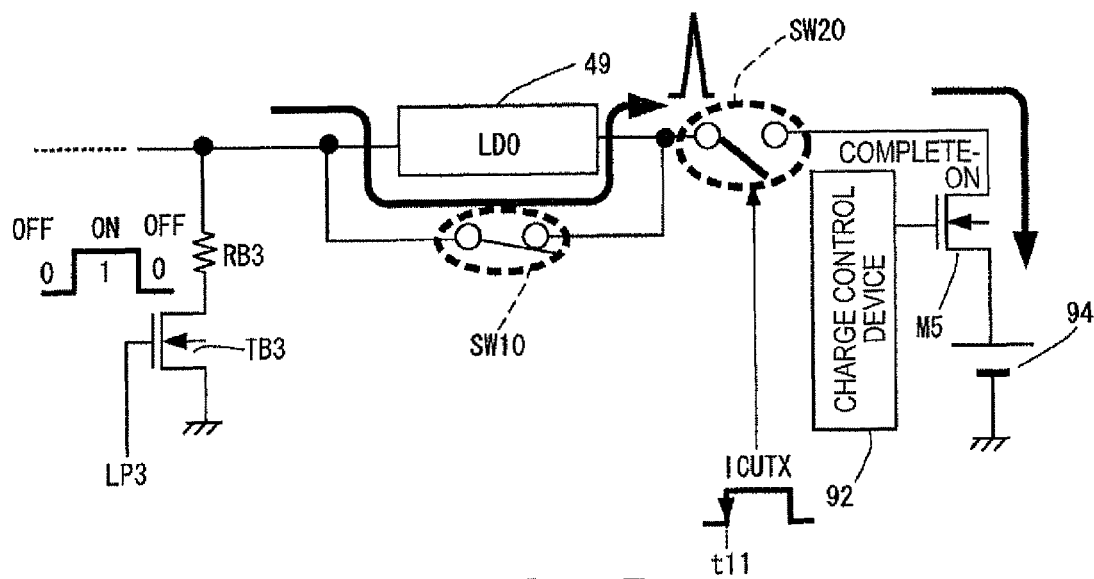
Figure 7C:
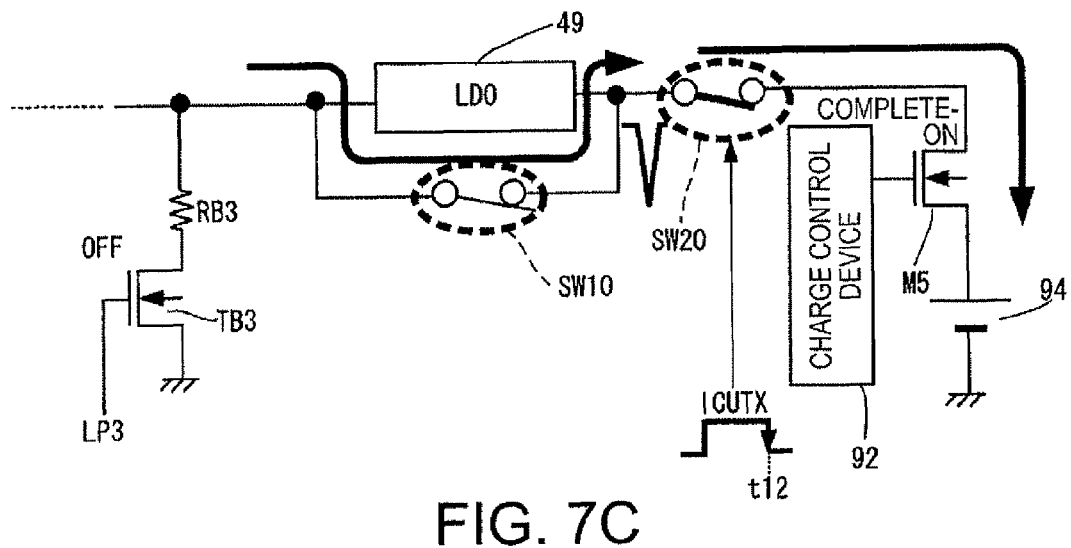

When the power feeding to the load 94 is temporarily stopped by the power supply control signal (ICUTX) in the ON state of the bypass path, overshoot or undershoot occurs at the voltage VD5 at the output node of the regulator (LDO) 49, as shown in FIGS. 7A to 7C.

FIGS. 7A to 7C are diagrams for explaining problems arising when the power feeding is temporarily stopped in the ON state of the bypass path. Referring to FIGS. 7A to 7C, SW10 denotes a switch circuit for tuning on/off the bypass path, and SW20 denotes a power feeding control switch (corresponding to the transistor M3 in the charging device 90).

In FIG. 7A, the switch circuit SW10 is turned on, and the power feeding control switch SW20 is also turned on. Accordingly, current is supplied to the load 94 through the bypass path.

When the power supply control signal (ICUTX) becomes an active level and the power feeding control switch SW20 is turned off in a state that the bypass path is in the ON state, flow of the current is stopped, as shown in FIG. 7B. When the bypass path is in the ON state, the regulator (LDO) 49 does not perform stabilizing operation of current (voltage). Therefore, the voltage level at the output node (or the input node) of the regulator sharply rises, causing overshoot.

When the power feeding to the load 94 is restarted, the power feeding control transistor MS provided in the power feeding path of the charging device (charger) rapidly draws the current so as to supply sufficient current to the secondary battery 94 which is the load, as shown in FIG. 7C. Accordingly, a state like that the secondary battery 94 and the output node of the regulator 49 are short-circuited is produced, sharply lowering the voltage at the output node of the regulator. The regulator 49 does not perform the stabilizing operation of the current (voltage) when the bypass path is at the ON state, causing undershoot.

Overshoot may cause a damage of an electronic circuit. Undershoot may disadvantageously cause reset of the charge control device (charge control IC) 92. Such the problems occur because the current (voltage) can not be controlled when the bypass path is at the ON state.

In order to avoid the above problems, the power receiving side control circuit 52 forcibly switches the bypass path to the OFF state at timing when the circuit 52 shifts the voltage level of the power supply control signal (ICUTX) from the non-active level to the active level (coinstantaneous timing) or at timing before the shift. Concretely, the periodic authentication control section 101 sets the bypass forcible off signal SA at the active level. Thereby, the bypass path is blocked off, and the current is supplied to the load 94 through the regulator (LDO) 49.

Then, in the state that the bypass is forcibly turned to the OFF state, the power feeding to the load 94 is temporarily stopped.

The regulator 49 has a function of stabilizing the current (voltage) by negative feedback control, for example. Therefore, in this case as well, the voltage at the output node (input node) of the regulator does not excessively rise but is instantly stabilized, causing no overshoot. Accordingly, problems such as breaking of the electronic circuit do not arise.

When the temporary stop of the power feeding to the load becomes unnecessary, the power receiving side control circuit 52 shifts the power supply control signal (ICUTX) from the active level (H) to the non-active level (L) so as to restart the power feeding to the load 94. At this time, the forcible off state of the bypass still remains. When the power feeding to the load is restarted, the transistor M5 provided in the power feeding path of the charging device (charger) 90 rapidly draws the current so as to supply sufficient current to the secondary battery 94 which is the load. Accordingly, a state like that the secondary battery 94 and the output node of the regulator 49 are short-circuited is produced, lowering the voltage VD5 at the output node of the regulator 49. However, the regulator (LDO) 49 has some level of ON-resistance and the current is limited by the ON-resistance, whereby no short circuit current flows. That is, when the regulator (LDO) 49 is bypassed, there is no element limiting the current, whereby short circuit current flows through the bypass path. On the other hand, in a state that the regulator (LDO) 49 is turned on, the ON-resistance of the regulator 49 functions as current limiting resistance, preventing the flow of the short circuit current. Time period from the time when the power supply control signal (ICUTX) is shifted from the active (H) level to the non-active (L) level to the time when the bypass forcible off is released is short, so that a range in which the voltage at the output node of the regulator (LDO) 49 fluctuates is limited.

Accordingly, the voltage VD5 does not excessively fall, so that large undershoot does not occur. Therefore, such disadvantage, for example, that the charge control device (charge control IC) 92 provided to the charging device 90 is reset due to large undershoot does not arise.

According to the first embodiment, power loss and heat generation of the power receiving device can be decreased by bypassing the regulator 49. Meanwhile, under the bypassing state, even when the power feeding to the load is temporarily stopped or when the power feeding, which has been stopped, is restarted, occurrence of overshoot and undershoot can be prevented. Accordingly, the power feeding capability to the load can be improved (for example, charging time for the secondary battery is shortened), and reliability of the power receiving device is also improved due to the prevention of overshoot and undershoot. Further, smooth and highly-reliable periodic authentication can be realized.

Releasing Timing of Bypass Forcible Off

As described above, when the forcible off state of the bypass remains, the power feeding, which has been temporarily stopped, to the load 94 is restarted. Then, the forcible off state of the bypass is preferably released after progression of time necessary for stabilizing the voltage, which is supplied to the load, so as to return the bypass to the ON state.

That is, unless a certain period of time passes after the power supply control signal (ICUTX) shifts from the active level to the non-active level and the power feeding to the load is restarted, the power feeding state to the load 94 is not stabilized. During the period, the voltage VD5 at the output node of the regulator 49 is unstable. If the bypass is turned on under this state, power may not be stably supplied to the load 94. Therefore, after time which is necessary for stabilizing the power feeding voltage passes after the restart of the power feeding to the load 94, the bypass forcible off state is released so as to return the bypass to the ON state. Accordingly, the power feeding via the bypass, which has been braked off, can be smoothly (stably) restarted.

Hysteresis Property in Bypass Control

Figure 8:
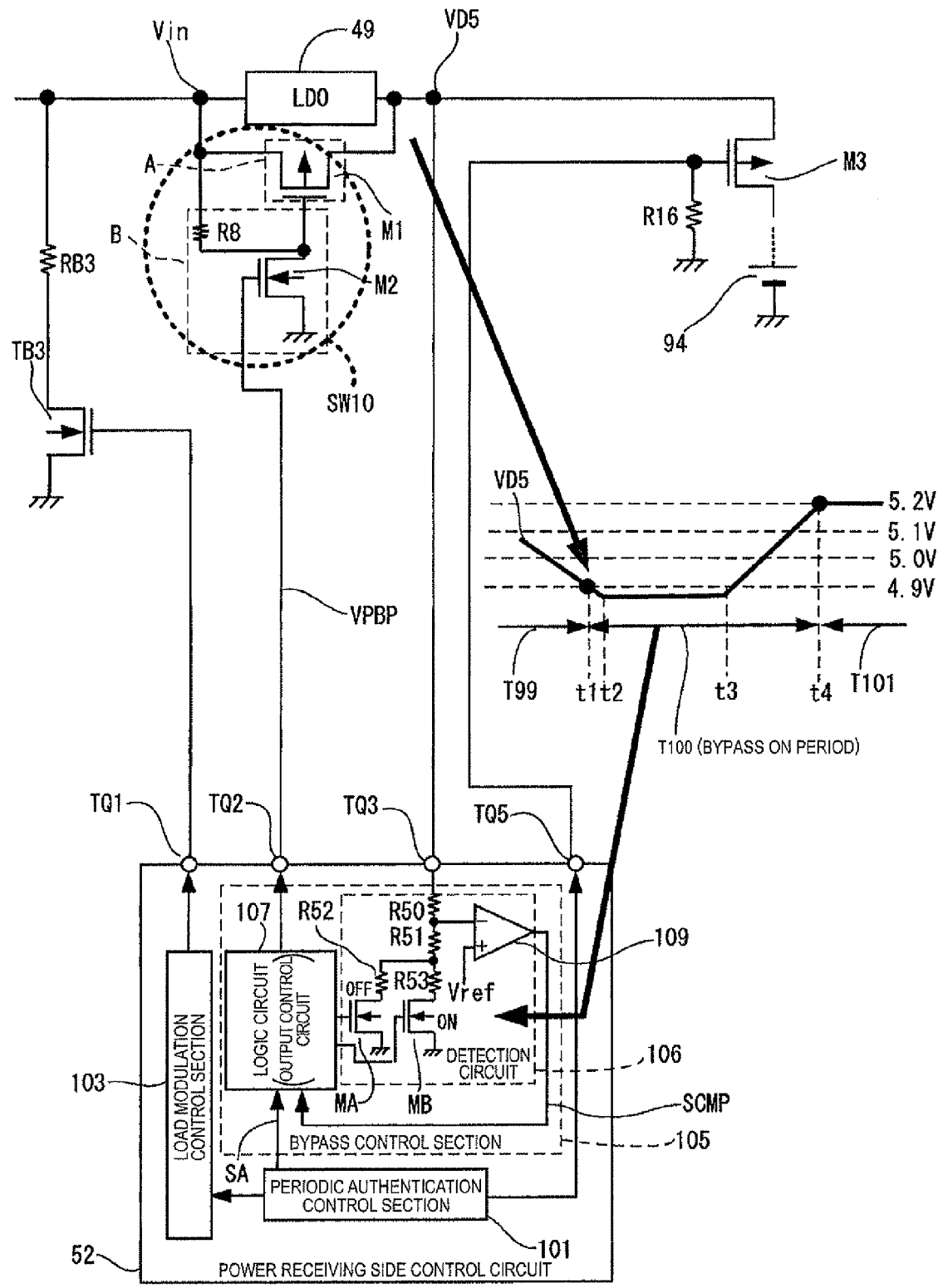
FIG. 8 is a diagram for explaining a hysteresis property in the bypass control.

FIG. 8 is a diagram for explaining a hysteresis property in bypass control. In a period in which the periodic authentication is not performed, when the detection circuit 106 detects that the voltage VD5 at the output node of the regulator is decreased lower than a first threshold voltage (4.9V), the bypass control section 105 turns the bypass to the ON state.

When the detection circuit 106 detects that the voltage at the output node (or the input node) of the regulator excesses a second threshold voltage (5.2V) after the bypass is turned to the ON state, the bypass control section 105 turns the bypass to the OFF state. Difference is provided between the first threshold value (4.9V) for ON-determination of the bypass and the second threshold value (5.2V) for OFF-determination of the bypass so as to prevent switching of the bypass to ON/OFF due to a noise overlapping with the power feeding path, for example. That is, once the voltage VD5 at the output node of the regulator 49 is decreased and the bypass is turned to the ON state, the bypass is not turned to the OFF state unless the voltage VD5 at the output node of the regulator 49 is sufficiently increased.

Referring to FIG. 8, a period T99 and a period T101 are a bypass-OFF period, and a period T100 is a bypass-ON period. In the bypass-OFF periods T99 and T101, the first NMOS transistor MA provided to the detection circuit 106 is turned on and the second NMOS transistor MB also provided to the detection circuit 106 is turned off. In the bypass-ON period T100, the first NMOS transistor MA of the detection circuit 106 is turned off and the second NMOS transistor MB is turned on.

As described above, when the periodic authentication is performed, the bypass forcible off signal SA is at the active level. Thereby, regardless of the voltage level of the voltage VD5, according to the detection circuit 106, at the output node of the regulator 49, the bypass control signal VPBP is fixed at the non-active level and the bypass is forcibly turned to the OFF state, switching from the power feeding through the bypass path to the power feeding through the regulator. Accordingly, overshoot or undershoot does not occur in the periodic authentication.

Operation Timing of Power Receiving Side Control Circuit

Figure 9A:
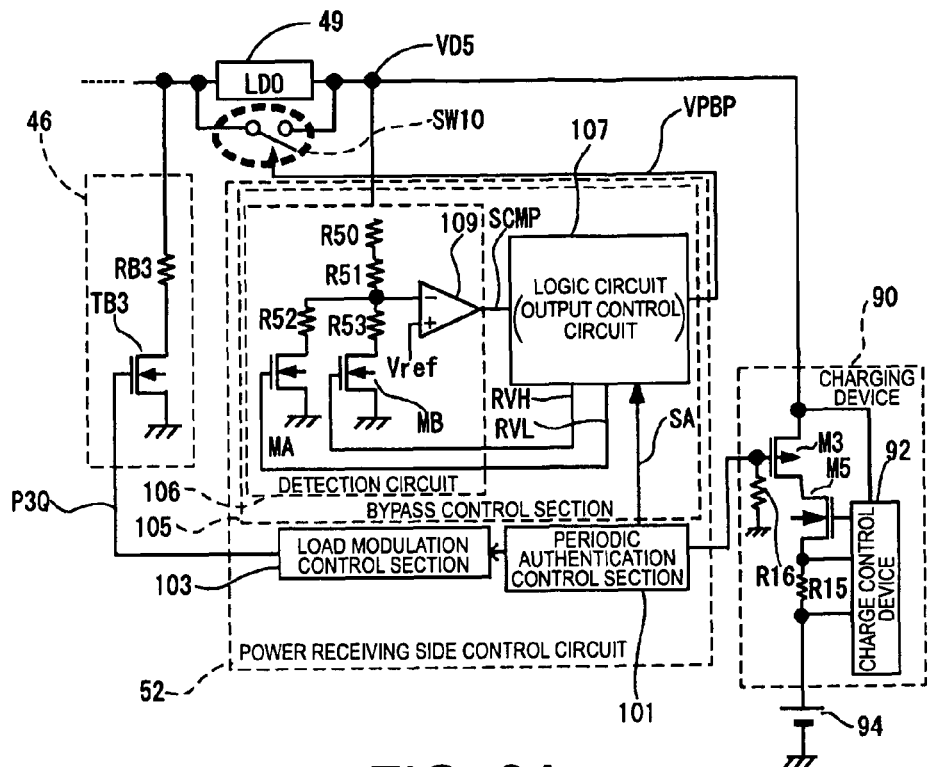
FIGS. 9A and 9B are diagrams for explaining timing of bypass control operations (load modulation, load reduction, bypass forcible off, and the like) of the power receiving side control circuit.
Figure 9B:
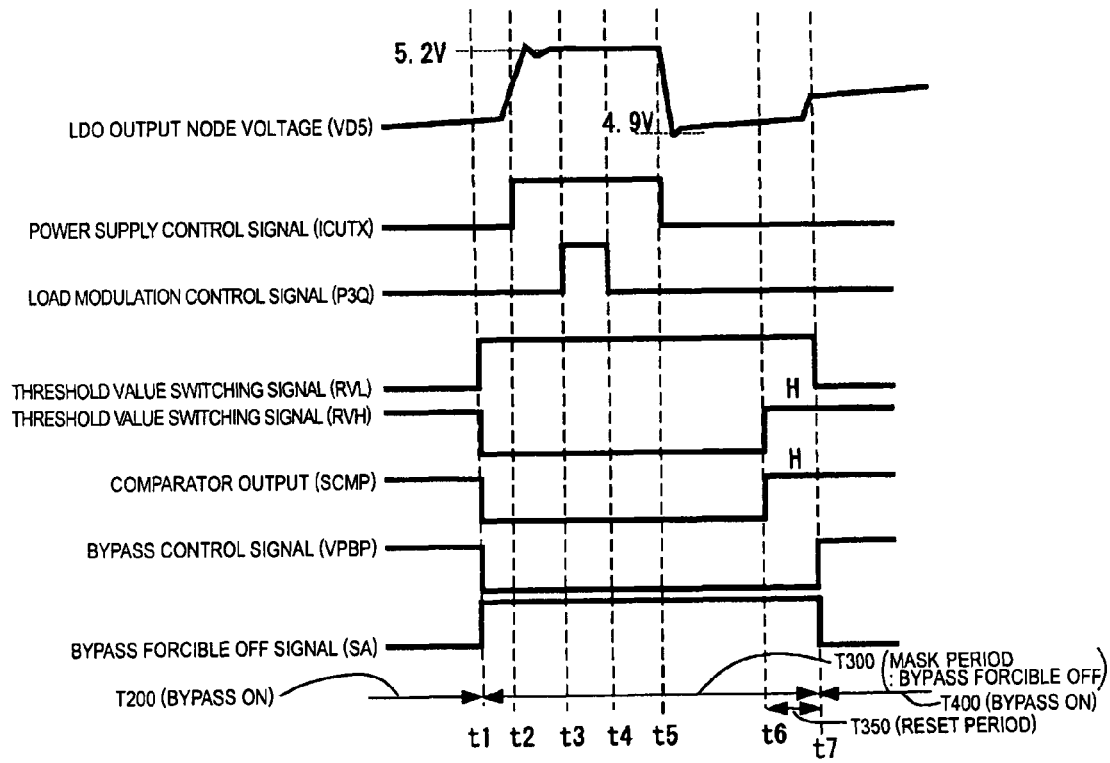

FIGS. 9A and 9B are diagrams for explaining timing of bypass control operations (load modulation, load reduction, bypass forcible off, and the like) of the power receiving side control circuit. FIG. 9A is a diagram showing a structure of a part, which is related to bypass control, of the power receiving control circuit. FIG. 9B is a waveform diagram showing operation timing of the circuit shown in FIG. 9A.

As shown in FIG. 9B, the bypass forcible off signal SA is at the H level during a period from time t1 to time t7. Accordingly, the bypass control signal VPBP is at the non-active level (L level) during the period from the time t1 to the time t7, and the bypass is forcibly turned to the OFF state during the period. That is, a period T300 from the time t1 to the time t7 is a mask period of the bypass (a bypass forcible off period). A period T200 before the time t1 and a period T400 after the time t7 are periods during which the bypass is at the ON state (bypass-ON periods).

The power supply control signal (ICUTX) is at the H level (active level) from the time t2 to the time t5. During the period, the power supply control transistor M3 in the charging device 90 is off, and therefore the power feeding to the load 94 is temporarily stopped.

The load modulation control signal P3Q is at the H level during a period from the time t5 to the time t4, whereby the load modulation transistor TBS3 is on during the period. Thereby, periodic load modulation (periodic authentication) is performed, for example.

A first threshold value switching signal RVL (ON/OFF control signal of the transistor MA) outputted from the logic circuit (output control circuit) 107 is at the H level during the period from the time t1 to the time t7. A second threshold value switching signal RVH (ON/OFF control signal of the transistor MB) outputted from the logic circuit (output control circuit) 107 is at the L level during the period from the time t1 to the time t6. During a period T350 from the time t6 to the time t7, the signals RVL and RVH are at the H level. The period T350 is a reset period in which the output signal SCMP of the detection circuit (hysteresis comparator) is reset.

The output signal SCMP of the detection circuit (hysteresis comparator) is at the L level during a period from the time t1 to the time t6.

Though the voltage level of the voltage VD5 at the output node of the regulator (LDO) rises at the time t2 at which the power supply control signal ICUTX rises, the voltage level is clamped at about 5.2V by the voltage stabilizing function of the regulator (LDO) 49. Thus large overshoot does not occur. Further, the voltage level of the voltage VD5 at the output node of the regulator (LDO) 49 is lowered at the time t5 at which the power supply control signal ICUTX falls. However, current is limited by high ON-resistance of the regulator 49, so that short current does not flow. Further, a period from the time t5 to the time t7 is short as shown in FIG. 9B, so that a range of fluctuation of the voltage at the output node of the regulator 49 is limited. Therefore, large undershoot does not occur.

In the example shown in FIG. 9B, the bypass forcible off signal SA becomes the active level at the time t1, and then the power supply control signal ICUTX becomes the active level at the time t2. However, these are not limited. For example, the bypass forcible off signal SA may become the active level simultaneously at the timing when the power supply control signal ICUTX becomes the active level (at the time t2).

Example of Bypass Control Procedures

FIGS. 10 to 15 are diagrams for explaining an example of a sequence of bypass control procedures. FIGS. 10 to 15 show numerals with a parenthesis as (1), (2), (3), and the like. The numerals with the parenthesis indicate procedures (steps) of major operations. Each of the drawings shows the major operations with a bold line. A resistance value of the resistance R52 included in the detection circuit is set to be larger than a resistance value of the resistance R53.

Figure 10:
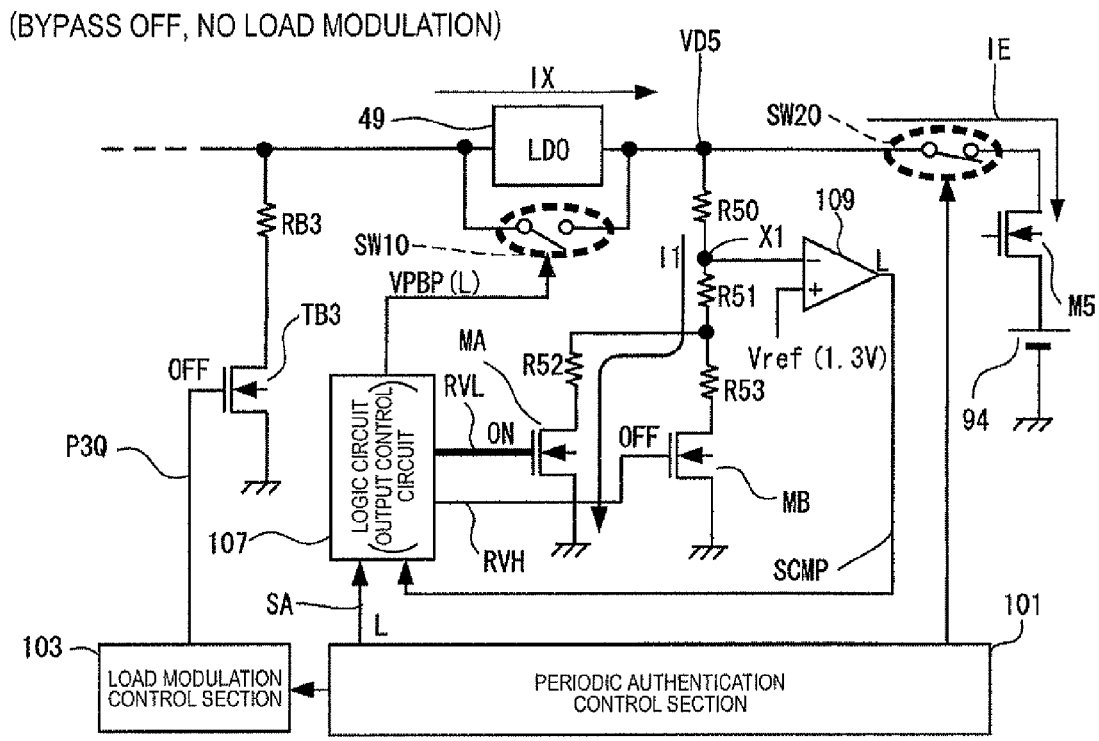
FIG. 10 is a diagram for explaining an example of bypass control procedures.

(1) Operation in Bypass-off and No Load Modulation State (Refer to FIG. 10)

The switch circuit SW10 which is used for turning the bypass path to the ON/OFF state is off. The power supply control switch SW20 is ON. Accordingly, current IX flows via the regulator (LDO) 49. In addition, load current IE flows via the power feeding control switch SW20.

In the detection circuit, the first NMOS transistor MA is ON. Thereby, bias current I1 flows via the division resistances R50, R51, and R52.

Since the resistance R52 has a large resistance value, a current amount of the bias current 11 is small. Therefore, voltage drop occurring at the division resistance R50 is small.

Therefore, unless the voltage VD5 at the output node of the regulator becomes sufficiently small, a level of voltage supplied to the inverting terminal of the comparator 109 (potential at the node X1) is higher than the reference voltage Vref (1.3V, for example) supplied to the non-inverting terminal. Accordingly, the output SCMP of the comparator 109 is at the L level.

Concretely, when a current amount of the bias current 11 is denoted as IX1 and resistance values of the division resistances R50, R51, and R52 are respectively denoted as R50, R51, and R52, a current amount IX1 is expressed as Formula (1) below.

$$IX1 = VD5/(R50+R51+R52) \quad (1)$$

When potential of the node X1 is denoted as VX1, VX1 is expressed by Formula (2) below.

$$VX1 = \{VD5 \cdot (R51+R52)\}/(R50+R51+R52) \quad (2)$$

The reference voltage Vref which is supplied to the non-inverting terminal of the comparator 109 is set to be 1.3V. As described above, when the voltage VD5 at the output node of the regulator (LDO) 49 is lowered to the first threshold voltage (4.9V), the output SCMP of the comparator 109 inverts from the L level to the H level. Accordingly, Formula (3) below is derived.

$$(R51+R52)/(R50+R51+R52) = 1.3/4.9 \quad (3)$$

By Formula (3), each value of R50, R51, and R52 is determined.

Figure 11:
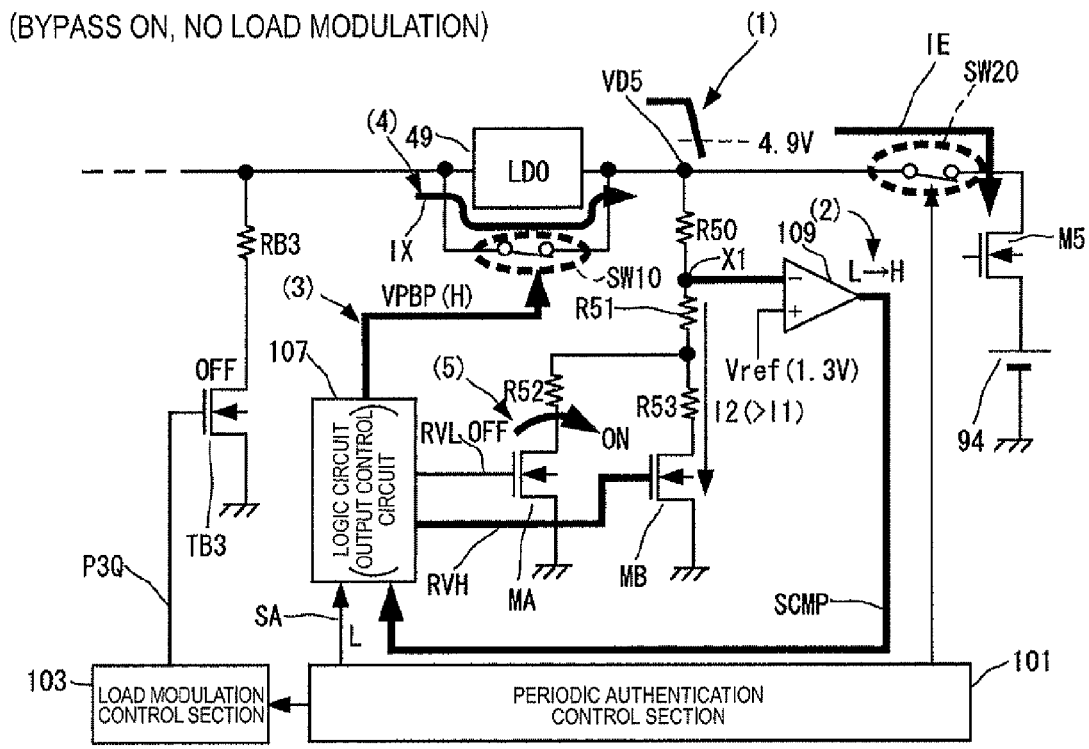
FIG. 11 is a diagram for explaining the example of the bypass control procedures.

(2) Operation in Bypass-ON and No Load Modulation State (Refer to FIG. 11)

As described above, the voltage VD5 at the output node of the regulator (LDO) 49 is lowered and becomes lower than the first threshold voltage (4.9V) (step (1)), the level of voltage supplied to the inverting terminal of the comparator 109 becomes lower than the reference voltage Vref (1.3V, for example) supplied to the non-inverting terminal. Thereby, the output SCMP of the comparator 109 shifts from the L level to the H level (step (2)).

When the logic circuit (output control circuit) 107 detects the shift from the L level to the H level of the output SCMP of the comparator 109, the circuit 107 shifts the bypass control signal VPBP from the non-active level (L) to the active level (H) (step (3)). Accordingly, the switch circuit SW10 is turned on, and the bypass becomes at the ON state (step (4)). Thereby, the current IX flows through the bypass.

The logic circuit (output control circuit) 107 sets the first threshold value switching signal RVL at the L level and the second threshold value switching signal RVH at the H level. Thereby, the first NMOS transistor MA is turned off, while the second NMOS transistor MB is turned on (step (5)). The resistance value of the resistance R53 is smaller than that of the resistance R52, so that the current amount of bias current I2 is larger than that of the bias current I1. Accordingly, the voltage drop at the resistance R50 becomes large. Therefore, unless the voltage level of the voltage VD5 becomes sufficiently high, the voltage level at the inverting terminal of the comparator 109 does not excess the reference voltage Vref. That is, once the bypass is turned to the ON state, the output level of the comparator 109 is inverted when the voltage VD5 excesses the second threshold voltage (5.2V). Thus, the hysteresis property is added to the input/output property of the detection circuit.

Concretely, when a current amount of the bias current I2 is denoted as IX2 and a resistance value of the division resistance R53 is denoted as R53, the current amount IX2 is expressed as Formula (4) below.

$$IX2 = VD5/(R50+R51+R53) \quad (4)$$

When potential at the node X1 is denoted as VX1, VX1 is expressed by Formula (5) below.

$$VX1 = \{VD5 \cdot (R51+R53)\}/(R50+R51+R53) \quad (5)$$

As described above, the reference voltage Vref which is supplied to the non-inverting terminal of the comparator 109 is 1.3V. When the voltage VD5 at the output node of the regulator (LDO) 49 rises up to the second threshold voltage (5.2V), the output SCMP of the comparator 109 inverts from the H level to the L level. An input offset voltage (input hysteresis voltage) of the comparator 109 is set to be 0.04V. The input offset voltage (input hysteresis voltage) is provided so as to prevent the voltage level of the output SCMP of the comparator 109 from changing due to an input of minute noise.

In this case, Formula (6) below is derived.

$$(R51+R53)/(R50+R51+R53)=(1.3+0.04)/5.2 \quad (6)$$

By Formula (6), the value of R53 is determined.

Figure 12:
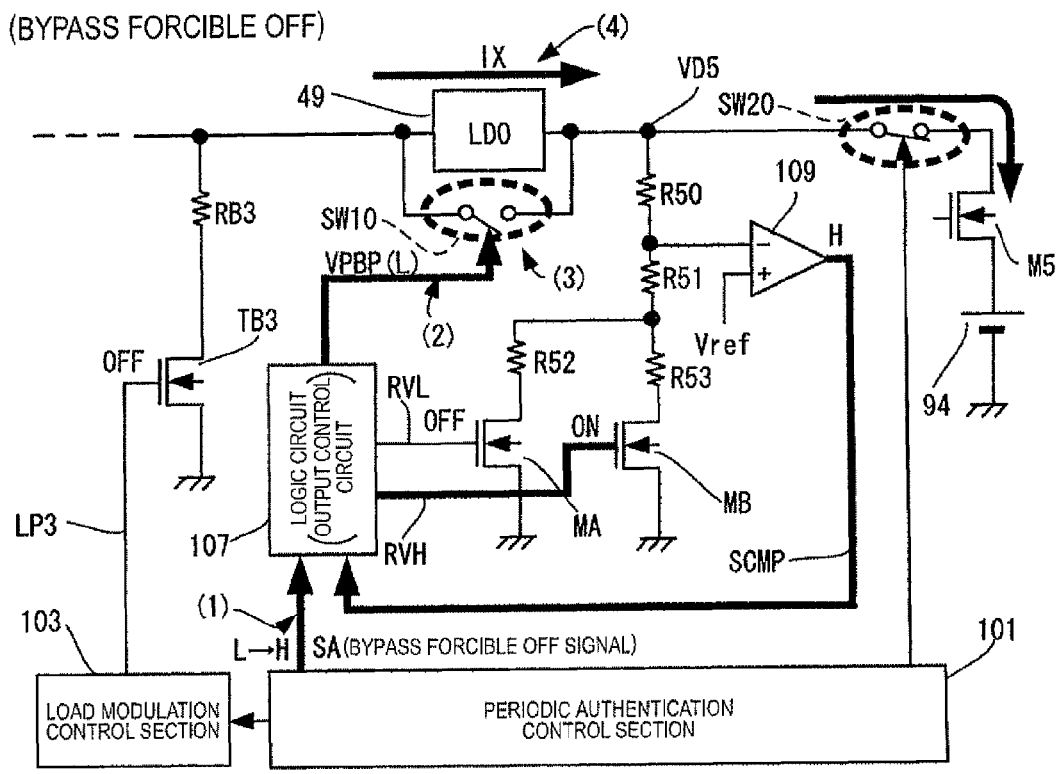
FIG. 12 is a diagram for explaining the example of the bypass control procedures.

(3) Bypass Forcible Off (Refer to FIG. 12)

The periodic authentication control section 101 sets the bypass forcible off signal SA at the active level (step (1)). The logic circuit (output control circuit) 107 sets the bypass control signal VPBP at the non-active level (step (2)). Thereby, the bypass control switch SW10 is turned off, breaking the bypass (step (3)). Consequently, the current IX flows via the regulator (LDO) 49 (step (4)).

Figure 13:
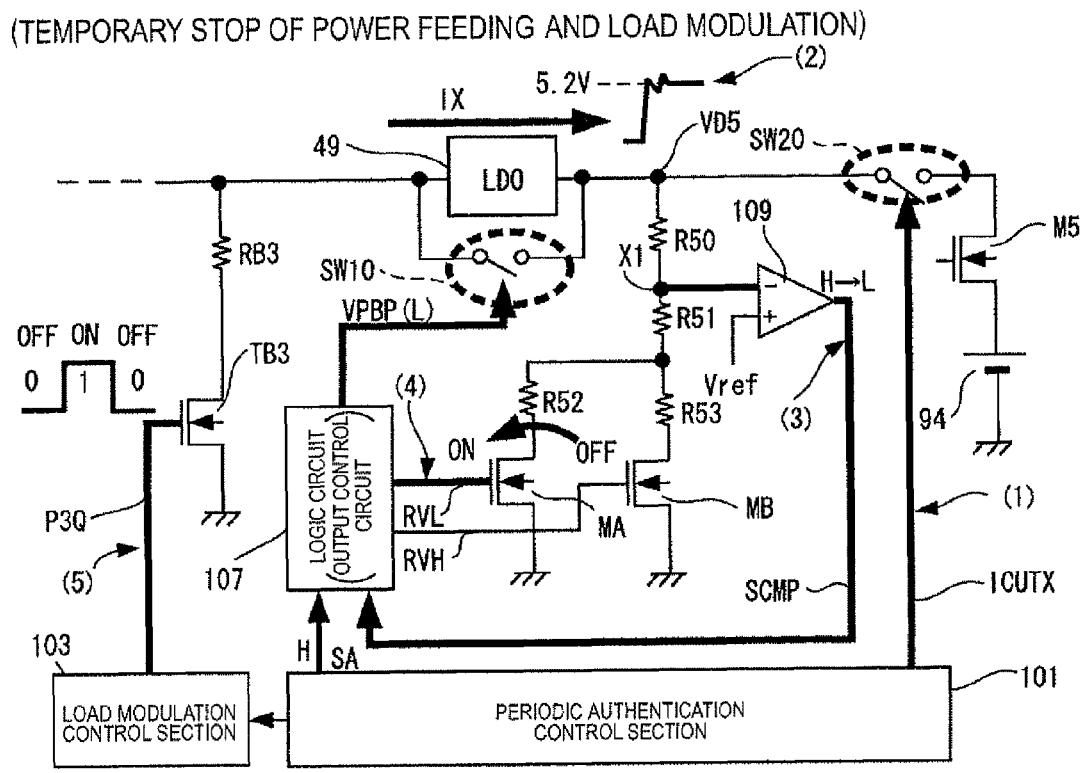
FIG. 13 is a diagram for explaining the example of the bypass control procedures.

(4) Load Reduction (temporary stop of power feeding) and Load Modulation (Refer to FIG. 13)

The periodic authentication control section 101 sets the power supply control signal (ICUTX) at the active level, and therefore the power supply control switch SW20 is turned off (step (1)). Thereby, the current IX is stopped and the voltage VD5 at the output node of the regulator (LDO) 49 rises, but the voltage VD5 is clamped at about 5.2V by the voltage stabilizing function of the regulator 49. Thereby, overshoot hardly occurs (step (2)). Accordingly, the electronic circuit or the secondary side device is not damaged.

When the voltage level of the voltage 1)5 excesses the second threshold voltage (5.2V), the output SCMP of the comparator 109 shifts from the H level to the L level (step (3)). The logic circuit (output control circuit) 107 sets the first threshold value switching signal RVL at the H level and the second threshold value switching signal RVH at the L level. Thereby, the first NMOS transistor MA is turned on, while the second NMOS transistor MB is turned off (step (4)).

The bypass forcible off signal SA outputted from the periodic authentication control section 101 remains at the active level (H level). The periodic authentication control section 101 instructs the load modulation control section 103 to perform load modulation for the periodic authentication. That is, the load modulation control section 103 turns on/off the load modulation transistor TB3. Thereby, a periodic authentication pattern "010", for example, is transmitted to the primary side (step (5)).

Figure 14:
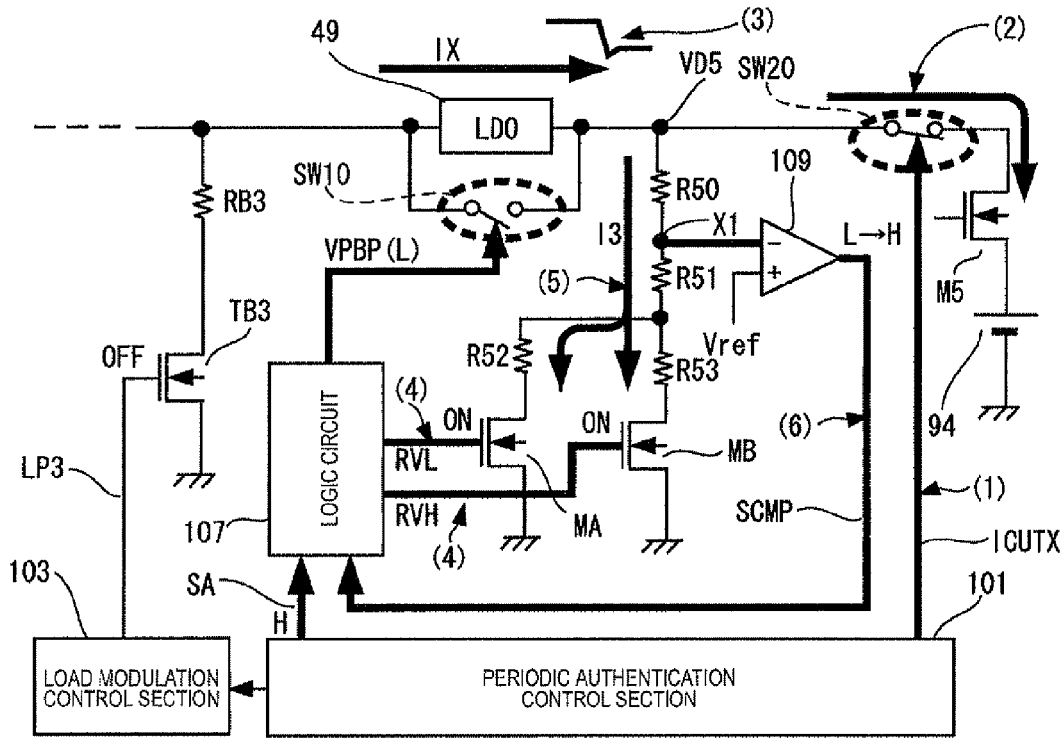
FIG. 14 is a diagram for explaining the example of the bypass control procedures.
Figure 15:
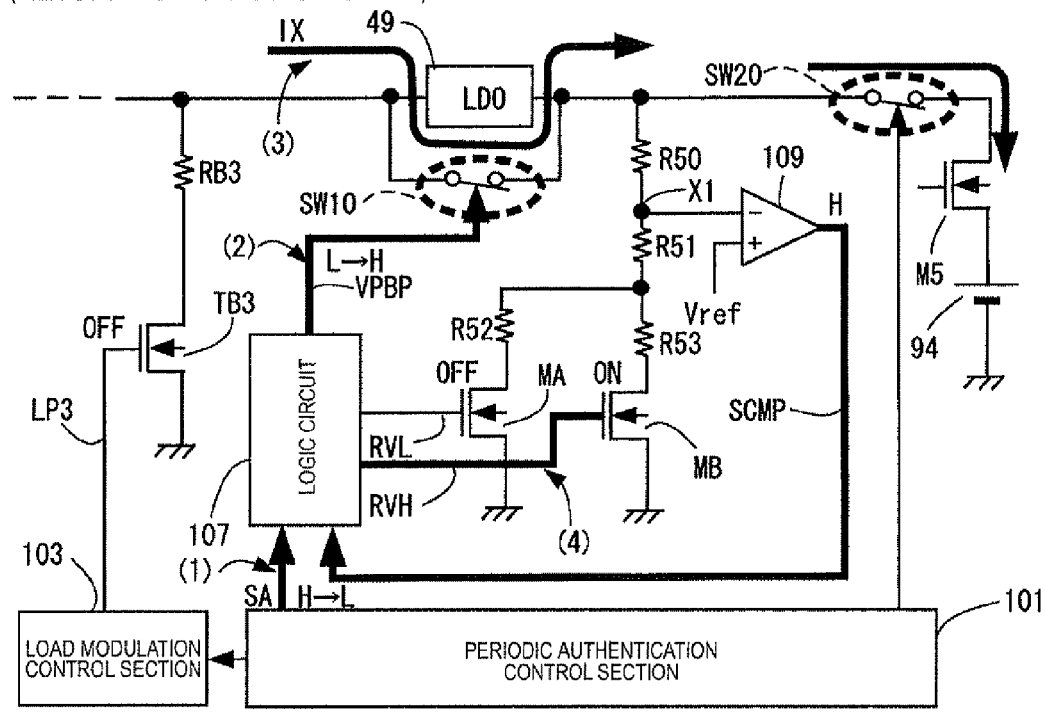
FIG. 15 is a diagram for explaining the example of the bypass control procedures.

(5) Release of Temporary Stop of Power Feeding and Reset of Comparator (Refer to FIG. 14)

The periodic authentication control section 101 sets the power supply control signal (ICUTX) at the non-active level after the completion of the load modulation for the periodic authentication (step (1)). Thereby, the power supply control switch SW20 is turned on, and the power feeding to the load 94 is restarted (step (2)).

When the power feeding to the load 94 is restarted, due to insufficient current, the power feeding control transistor M5 provided on the power feeding path of the charging device (charger) 90 is nearly at a complete-on state due to the negative feedback control of the charging control device 92, for example. Therefore, the power feeding control transistor M5 rapidly draws the current in order to supply sufficient current to the secondary battery 94 as the load. Accordingly, a state like that the secondary battery 94 and the output node of the regulator 49 are short-circuited is produced, lowering the voltage VD5 at the output node of the regulator 49.

However, the regulator (LDO) 49 has large ON-resistance and the current is limited by the ON-resistance, whereby no short circuit current flows. Further, time period from the time when the power supply control signal (ICUTX) is shifted from the active level (H) to the non-active level (L) (the time t5 in FIG. 9B) to the time when the bypass forcible off is released (the time t7 in FIG. 9B) is short, so that a range in which the voltage VD5 at the output node of the regulator (LDO) 49 fluctuates is limited. Therefore, the voltage VD5 is not lowered excessively, and undershoot hardly occurs (step (3)).

Accordingly, such disadvantage, for example, that the charge control device (charge control IC) 92 provided to the charging device 90 is reset due to large undershoot does not arise.

Immediately after the power feeding to the load 94 which is the power feeding object is restarted, a control operation for the load current by the charge control device 92 sometimes does not efficiently work, whereby the voltage level of the voltage VD5 is not stabilized. Therefore, the bypass is preferably returned to the ON state after progression of a period of time that is required for the voltage VD5 to be stabilized to some extent.

During this period of time, the detection circuit 106 (hysteresis comparator) is reset so as to prepare for the return to the ON state of the bypass. The detection circuit 106 is substantively composed of a hysteresis comparator, as described above. The hysteresis comparator is a comparator in which an input/output property with hysteresis is realized by positively feeding back an output of the comparator to an input. The output level of the hysteresis comparator depends on the input level. In order to return the bypass to the ON state after the bypass is forcibly turned to the OFF state, the hysteresis comparator needs to be reset so as to return the state of the hysteresis comparator (that is, an input voltage, an output voltage, and the like of the hysteresis comparator) to a state corresponding to the ON state of the bypass. However, as described above, the unstable state of the power feeding voltage caused by the temporary stop of the power feeding to the load remains until a certain period of time passes after the restart of the power feeding.

In a period in which the power feeding voltage is unstable, the voltage VD5 at the output node of the regulator is also unstable, and the input voltage level of the hysteresis comparator as the detection circuit 106 provided to the bypass control section 105 is unstable. Therefore, the state of the hysteresis comparator may not be able to be returned to the state corresponding to the ON state of the bypass.

Therefore, the hysteresis comparator is forcibly reset. That is, as shown in FIG. 14, the logic circuit (output control circuit) 107 sets the first threshold value switching signal RVL and the second threshold value switching signal RVH at the H level. Thereby, both of the first NMOS transistor MA and the second NMOS transistor MB are turned on (step (4)). Accordingly, a current bias path composed of the resistance R50, the resistance R51, and a parallel resistance of the resistances R52 and R53 is formed, and bias current I3 flows through the current bias path (step (5)).

A resistance value of the parallel resistance of the resistances R52 and R53 is sufficiently small, so that a current amount of the bias current I3 flowing the current bias path is large, increasing the voltage drop occurring at the resistance R50. Therefore, at the normal voltage level of the voltage VD5, the voltage level at the inverting terminal of the comparator 109 is lower than the voltage level of the reference voltage Vref supplied to the non-inverting terminal. Accordingly, the output of the comparator 109 inverts from the L level to the H level (step (6)). Even if the voltage VD5 is 5.6V (substantially high voltage), for example, the output of the comparator 109 inverts from the L level to the H level.

The state, in FIG. 14, that the output of the comparator 109 is inverted from the L level to the H level is same as the state, shown in FIG. 11, of the output of the comparator 109 when the bypass is at the ON state.

Thus, in a period from when the temporary stop of the power feeding to the load 94 is released to when the bypass forcible off state is released, within the period in which the bypass path is forcibly turned to the OFF state, the logic circuit (output control circuit) 107 forcibly decreases the input voltage level of the hysteresis comparator serving as the detection circuit 106 (forcibly produces a state same as a state that the voltage VD5 is sufficiently decreased) so as to securely return the output voltage level of the hysteresis comparator to the voltage level of the state that the bypass is at the ON state. That is, the hysteresis comparator is reset. Thus, the preparation to return the bypass from the OFF state to the ON state is completed.

(6) Return to Bypass-On State (Refer to FIG. 15)

Then, the periodic authentication control section 101 returns the bypass forcible off signal SA to the non-active level (L level) at the time when the power feeding voltage is stabilized at least to some degree (step (1)). The logic circuit (output control circuit) 107 switches the bypass control signal VPBP from the L level to the H level (step (2)). Accordingly, the switch circuit SW10 is turned on and therefore the bypass path is formed, whereby the current IX flows through the bypass path (step (3)).

The logic circuit (output control circuit) 107 sets the first threshold value switching signal RVL at the L level and the second threshold value switching signal RVH at the H level. Thereby, the first NMOS transistor MA is turned off, while the second NMOS transistor MB is turned on (step (4)).

Thus, the bypass which has been forcibly turned to the OFF state can be smoothly returned to the ON state.

Second Embodiment

Figure 16:
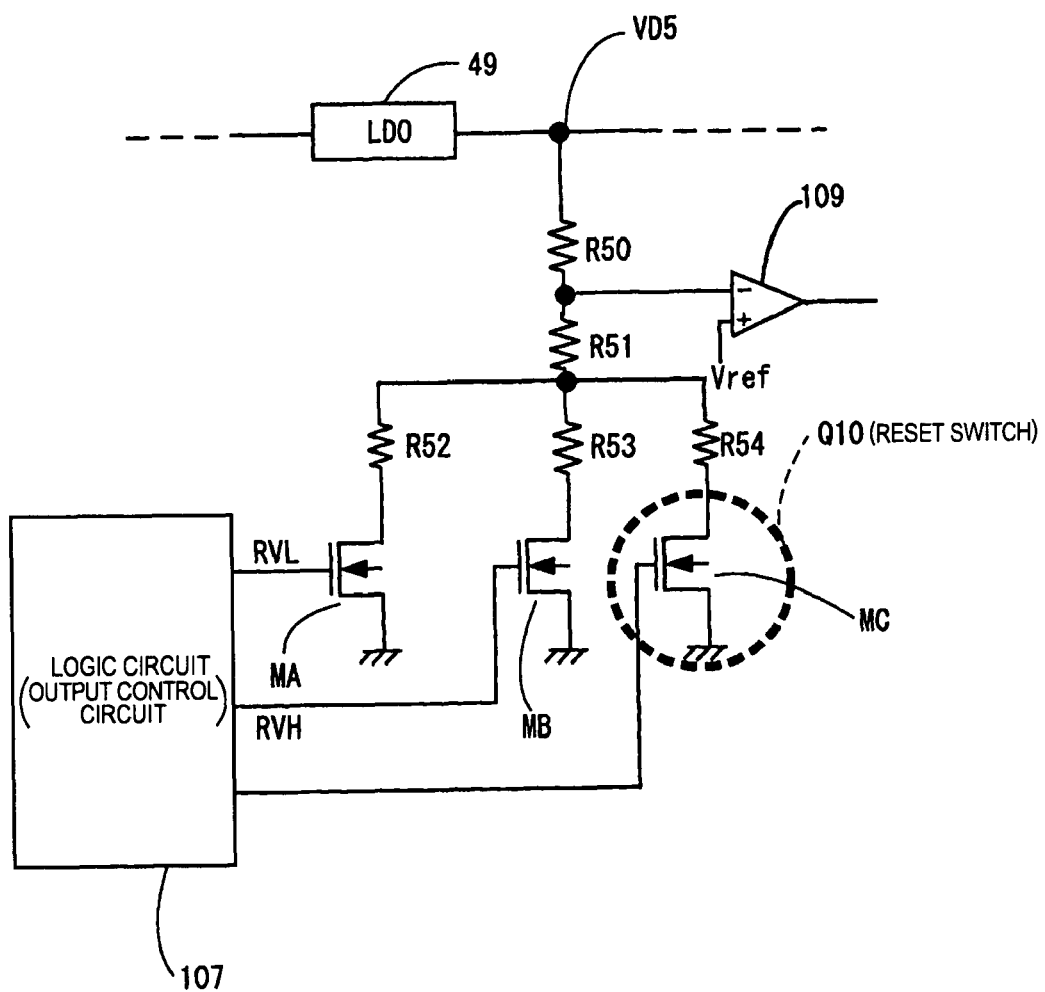
FIG. 16 is a diagram showing a circuit structure of a power receiving side control circuit according to a second embodiment.

FIG. 16 is a diagram showing a circuit structure of a power receiving side control circuit according to a second embodiment. In the first embodiment, as shown in FIG. 14, the first NMOS transistor MA and the second NMOS transistor MB are simultaneously turned on so as to reset the hysteresis comparator.

In the second embodiment, as shown in FIG. 16, a reset switch Q10 (composed of a reset transistor MC, for example) is provided in parallel to the first NMOS transistor MA and the second NMOS transistor MB. Further, a resistance value of the resistance R54 is set to be sufficiently smaller than those of the resistances R52 and R53.

For the reset of the comparator, the reset switch Q10 (the reset transistor MC) is turned on under a state that the first NMOS transistor MA and the second NMOS transistor MB are off. The resistance value of the resistance 54 is small, so that large amount of current flows through the bias current path including the resistances R50, R51, and R54, increasing the voltage drop at the resistance R51. Therefore, a voltage level of an inverting terminal of the comparator 109 becomes lower than a voltage level of the reference voltage Vref supplied to the non-inverting terminal regardless of a voltage level of the voltage VD5. Accordingly, an output of the comparator 109 inverts from the L level to the H level. Thus, the hysteresis comparator is reset.

As described above, according to the embodiments, the bypassing technique of the regulator can decrease power loss and heat generation of the power receiving device, for example. Further, even when power feeding to the load is temporarily stopped or when the power feeding, which has been stopped, is restarted in the bypassing state, occurrence of overshoot and undershoot can be prevented.

Accordingly, such a power receiving device and a power receiving control device for a contactless power transmission system are realized that have excellent properties such as small-size, low loss, and low heat generation and have high reliability due to no occurrence of overshoot and undershoot caused by load modulation in a normal power transmission.

The present invention is applicable to various electronic devices such as watches, codeless phones, shavers, electric toothbrushes, wrist computers, handy terminals, personal digital assistants, and electric bicycles. Especially, the invention is suitably applied to mobile terminals (including a cell phone unit, a PDA terminal, and a portable personal computer terminal) or watches. The power receiving device according to the invention has a simple and small-sized structure so as to be able to be mounted on mobile terminals or the like. Further, the power receiving device operates with low loss, so that charging time of a secondary battery in the electronic apparatus is short. Yet further, the generation of the power receiving device is reduced, so that reliability from a viewpoint of a safety aspect of the electronic apparatus is improved.

In addition, overshoot and undershoot caused by the load modulation in the normal power transmission do not occur, so that a secondary side apparatus is not damaged or a circuit is not required to be reset. Accordingly, reliability of the electronic apparatus is enhanced.

While the embodiment has been described in detail above, it will be understood by those skilled in the art that a number of modifications can be made to the embodiments without substantially departing from new matters and advantages of this invention. All of such modifications are to be regarded to be in the scope of the invention.

For example, when the switch circuit is turned on to bypass the regulator, an operation of the regulator may be stopped. Accordingly, wasteful power consumption and heat generation are further suppressed, minimizing loss of received power. In a case of making all of the components of the regulator non-operating, the power consumption and the heat generation of the regulator can be nil. Further, in a case of making a part of the components non-operating, the power consumption and the heat generation of the regulator can be decreased. With this structure, in the power receiving device using the contactless power transmission, the power feeding capability to the load can be efficiently improved while minimizing loss of the received power, and the heat generation which is a problem in the regulator can be solved.

For example, terms (an AC adapter, a GND, a cell phone unit, a charger, and the like) referred to as different terms (an external power source supply device, a power source at a low potential side, an electronic apparatus, and the like) having broader meanings or having the same definitions of the terms in the specification and the drawings can be replaced with the different terms in any part of the specification and the drawings. Further, combinations of the embodiments and modifications can be included in the scope of the invention. Structures and operations of the power receiving device and other control circuits, the transmission method in the AC adaptor connection detection, and the like are not limited to the above description, and various modifications can be made.

The switch circuit for bypassing the regulator (LDO) and the bypass control section for tuning on/off the switch circuit may have optimal structures which are adequately selected. For example, a high-performance circuit composed of a plurality of semiconductor elements may be used. Further, the heat generation of the regulator can be actively decreased by such a method that a temperature around the regulator is detected, and the bypass path is turned to the ON state when the temperature becomes high.

The present invention can effectively reduce power loss and heat generation in a power receiving device (a device at a side receiving a power supply) using a contactless power transmission technique with a simple structure. Further, the invention can securely prevent occurrence of large overshoot and large undershoot caused by temporary stop or release of the temporary stop of power feeding. Therefore, the invention is available as a power receiving control device (power receiving control LSI), a power receiving device (power receiving IC module), an electronic apparatus (mobile terminals, for example), and the like that use the contactless power transmission.

What is claimed is:

1. A power receiving control device provided to a power receiving device included in a contactless power transmission system, the contactless power transmission system transmitting electric power from a power transmission device to the power receiving device by electromagnetically coupling a primary coil and a secondary coil so as to feed the electric power to a load serving as a power feeding object from a voltage output node of the power receiving device, the power receiving device including a rectifying circuit and a regulator; and transmitting a load modulation signal to the power transmission device by load modulation performed by a load modulation section included in the power receiving device, in a period of the power feeding to the load as the power feeding object, the power receiving control device comprising:
   a power receiving side control circuit that controls an operation of the power receiving device; and
   a power supply control signal output terminal that outputs a power supply control signal by which the power feeding to the load is temporarily stopped, the power receiving side control circuit turning on a switch circuit provided between an input node and an output node of the regulator, based on detection of lowering of power feeding capability to the load, so as to put a bypass path in an ON state, the bypass path directly connecting the input node and the output node of the regulator; the power receiving side control circuit turning off the switch circuit so as to forcibly put the bypass path in an OFF state, in a case where the power feeding to the load is temporarily stopped in a period during which the bypass path is formed, at one of timing at which a voltage level of the power supply control signal outputted from the power supply control signal output terminal is switched from a non-active level to an active level so as to temporarily stop the power feeding to the load and timing before the power feeding to the load is temporarily stopped, and the power receiving side control circuit turning on the switch circuit after releasing the temporary stop of the power feeding to the load so as to return the bypass path to the ON state.

2. The power receiving control device according to claim 1, the power receiving side control circuit turning on the switch circuit so as to return the bypass path to the ON state after progression of time necessary for stabilizing a voltage supplied to the load, after releasing the temporary stop of the power feeding to the load.

3. The power receiving control device according to claim 1, the power receiving side control circuit including:
   a bypass control section outputting a bypass control signal for controlling ON and OFF of the switch circuit provided between the input node and the output node of the regulator; and
   a periodic authentication control section, the periodic authentication control section performing periodic authentication by controlling an operation of the load modulation section included in the power receiving device so as to periodically modulate the load of the power receiving device, the periodic authentication control section outputting the power supply control signal from the power supply control terminal in the periodic load modulation so as to temporarily stop the power feeding to the load, and supplying a bypass forcible off signal to the bypass control section,
   the bypass control section including a detection circuit and an output control circuit,
   the detection circuit detecting a voltage level of at least a voltage at the input node and a voltage at the output node of the regulator so as to output a detection signal showing a result of the detection,
   the output control circuit controlling ON and OFF of the switch circuit by switching the bypass control signal to one of an active level and a non-active level based on the detection signal outputted from the detection circuit when the bypass forcible off signal outputted from the periodic authentication control section is at a non-active level, and
   the output control circuit fixing the bypass control signal at the non-active level regardless of a level of the detection signal when the bypass forcible off signal is at an active level so as to inhibit the switch circuit from turning on.

4. The power receiving control device according to claim 3, the detection circuit setting the detection signal at the active level when at least one of the voltage at the input node and the voltage at the output node of the regulator is lower than a first threshold voltage, and the detection circuit setting the detection signal at the non-active level when the at least one of the voltage at the input node and the voltage at the output node of the regulator is higher than a second threshold voltage, the second threshold voltage being higher than the first threshold voltage,
   when the bypass forcible off signal outputted from the periodic authentication control section is at the non-active level, the output control circuit setting the bypass control signal at the active level and thus turning on the switch circuit in a period during which the detection signal is at the active level so as to put the bypass path in the ON state, and the output control circuit setting the bypass control signal at the non-active level and thus turning off the switch circuit in a period during which the detection signal is at the non-active level so as to put the bypass path in the OFF state, and
   when the bypass forcible off signal outputted from the periodic authentication control section is at the active level, the output control circuit fixing the bypass control signal at the non-active level regardless of a level of the detection signal so as to inhibit the switch circuit from turning on.

5. The power receiving control device according to claim 3, the detection circuit being composed of a hysteresis comparator, and in a period from when the temporary stop of the power feeding to the load is released to when a bypass forcible off state is released, within the period during which the bypass path is forcibly put in the OFF state by the bypass forcible off signal outputted from the periodic authentication control section, the output control circuit resetting the hysteresis comparator serving as the detection circuit so as to return a state of an input signal and a state of an output signal of the hysteresis comparator to the state of the input signal and the state of the output signal when the bypass path is at the ON state.

6. A power receiving device, comprising:

the power receiving control device according to claim 1;

a power receiving section including the rectifying circuit and converting an induced voltage of the secondary coil into a direct current voltage; and a power feeding control section including the regulator and the switch circuit, the switch circuit being provided between the input node and the output node of the regulator, and controlling the power feeding to the load.

7. An electronic apparatus, comprising:

the power receiving device according to claim 6; and the load as the power feeding object to which electric power is fed by the power receiving device.

* * * * *